United States Patent
Eguchi

(10) Patent No.: US 7,342,638 B2
(45) Date of Patent: Mar. 11, 2008

(54) ELECTRO-OPTICAL DEVICE, METHOD OF MANUFACTURING THE SAME, AND METHOD OF MANUFACTURING SUBSTRATE DEVICE

(75) Inventor: Yoshikazu Eguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 710 days.

(21) Appl. No.: 10/846,536

(22) Filed: May 17, 2004

(65) Prior Publication Data

US 2005/0007356 A1    Jan. 13, 2005

(30) Foreign Application Priority Data

May 27, 2003    (JP)    ............................. 2003-149651

(51) Int. Cl.
*G02F 1/13*    (2006.01)

(52) U.S. Cl. ...................... 349/187; 349/138; 438/692; 216/38

(58) Field of Classification Search ................ 349/187, 349/138, 147, 149–152, 43, 110; 438/689–692, 438/697; 216/37, 38, 41
See application file for complete search history.

(56) References Cited

U.S. PATENT DOCUMENTS

| | | | |
|---|---|---|---|
| 6,157,429 A | 12/2000 | Miyawaki et al. | |
| 6,172,721 B1* | 1/2001 | Murade et al. | 349/43 |
| 6,373,544 B1 | 4/2002 | Hirabayashi | |
| 6,577,371 B2 | 6/2003 | Hirabayashi | |
| 6,746,888 B2* | 6/2004 | Hashimoto et al. | 438/30 |
| 7,014,669 B2* | 3/2006 | Small et al. | 51/307 |
| 2004/0027508 A1* | 2/2004 | Akiyama et al. | 349/56 |

FOREIGN PATENT DOCUMENTS

| | | |
|---|---|---|
| JP | A-10-177181 | 6/1998 |
| JP | A-11-72804 | 3/1999 |
| JP | A-2000-194008 | 7/2000 |
| JP | A 2000-340567 | 12/2000 |

* cited by examiner

*Primary Examiner*—Thoi V. Duong
(74) *Attorney, Agent, or Firm*—Oliff & Berridge, PLC

(57) ABSTRACT

According to an aspect of the invention, to completely planarize the outermost surface of a laminated structure by appropriately performing a planarizing process, such as a CMP process, in an electro-optical device, such as a liquid crystal device, an electro-optical device includes TFTs that constitute driving circuits to drive data lines and scanning lines that are arranged in a peripheral region around an image display region, and an interlayer insulating film formed on the data lines, scanning lines, TFTs, and the driving circuits. In the interlayer insulating film formed in the peripheral region, after an etching process is performed on at least portions corresponding to regions in which the driving circuits are formed, a CMP process is performed on the peripheral region and the image display region.

9 Claims, 13 Drawing Sheets

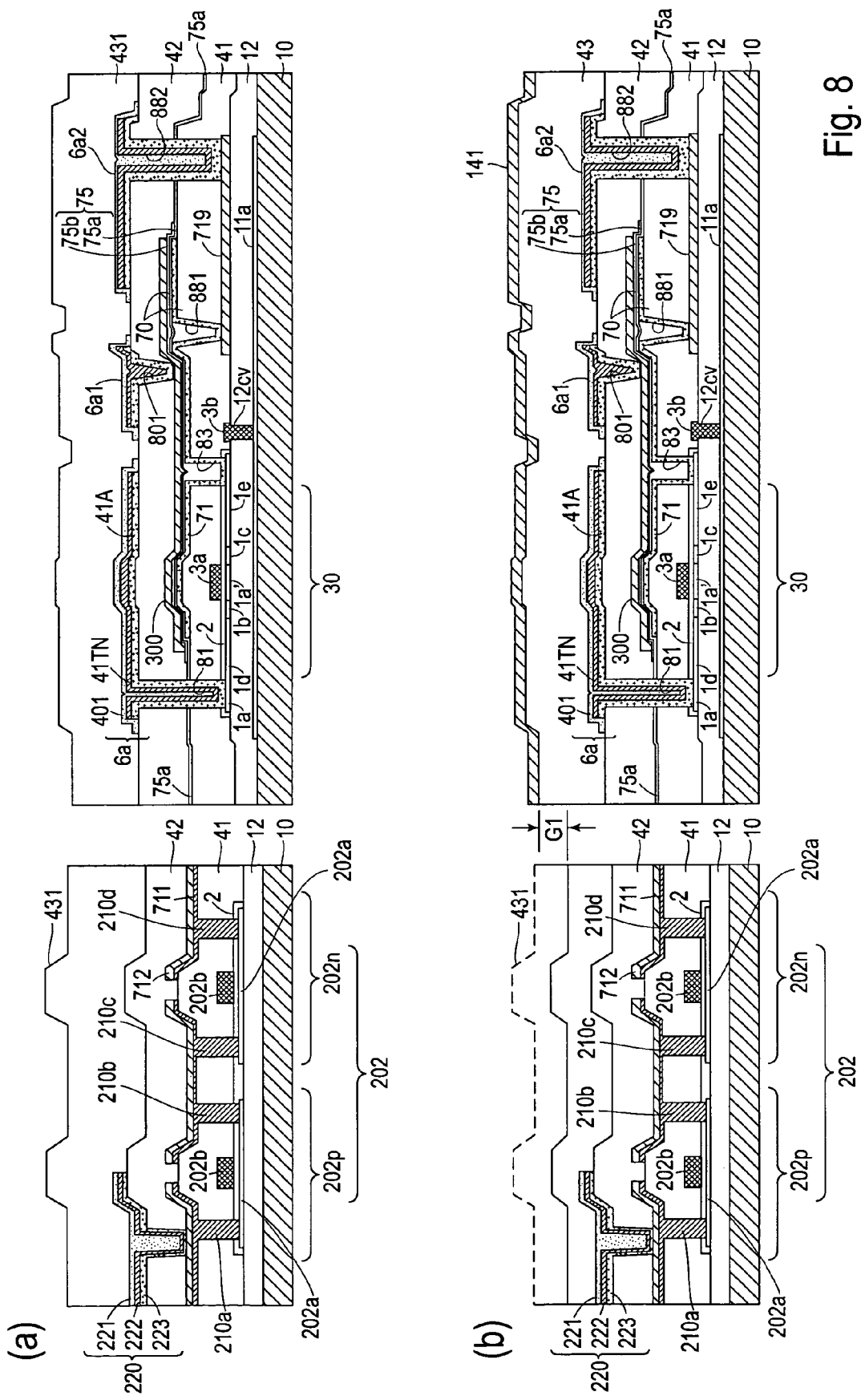

ELECTRO-OPTICAL DEVICE, METHOD OF MANUFACTURING THE SAME, AND METHOD OF MANUFACTURING SUBSTRATE DEVICE

BACKGROUND OF THE INVENTION

1. Field of Invention

The present invention relates to an electro-optical device, such as an active matrix liquid crystal device, an electrophoresis device, such as an electronic paper, or an electroluminescence (EL) display device, and a method of manufacturing the same. The present invention also relates to an electronic apparatus including such an electro-optical device. Furthermore, the present invention relates to a method of manufacturing a substrate device.

2. Description of Related Art

There are related art active matrix electro-optical devices including a substrate, pixel electrodes arranged in a matrix on the substrate, thin film transistors (hereinafter, TFTs) connected to the respective pixel electrodes, and data lines and scanning lines that are connected to the respective TFTs and that are arranged to be parallel to the TFTs in column and row directions.

Such an electro-optical device includes a counter substrate that faces the substrate, a counter electrode that is provided on the counter substrate and that faces the pixel electrodes, and a liquid crystal layer interposed between the pixel electrodes and the counter electrode to thus display images. The alignment state of liquid crystal molecules in the liquid crystal layer is appropriately changed in accordance with a predetermined potential difference set between the pixel electrodes and the counter electrode. Therefore, the transmittance of light that passes through the liquid crystal layer changes to thus display images.

According to the related art electro-optical device, the TFTs, the data lines, the scanning lines, and the pixel electrodes are commonly formed on the substrate to constitute a laminated structure. To be specific, various components and interlayer insulating films are alternately arranged to form the laminated structure such that the TFTs are formed on the layer closest to the surface of the substrate. The data lines are formed on the TFTs with the interlayer insulating film interposed therebetween. The pixel electrodes are formed on the data lines with another interlayer insulating film interposed therebetween. In this case, since the TFTs, the scanning lines, and the data lines have their own heights, the heights affect their upper layers of the laminated structure to thus commonly generate a step difference on the outermost surface of the laminated structure. When the step difference is generated, for example, a rubbing process on an alignment film may be unevenly performed.

Therefore, according to the related art, a planarizing process, such as a chemical mechanical polishing (CMP) process, is performed on the outermost surface of the laminated structure. As a result, since the step difference on the outermost surface is generally made even to thus generate a flat surface, the above-mentioned problems do not occur. Also, it is possible to enhance the contrast ratio of images by performing the CMP process. An example of using the CMP process is described in Japanese Unexamined Patent Application Publication No. 2000-340567.

SUMMARY OF THE INVENTION

However, the following problems occur in performing the above-mentioned CMP process. That is, scanning line driving circuits and a data line driving circuit (hereinafter, "driving circuits") to drive the scanning lines and the data lines as well as the TFTs, the scanning lines, the data lines, and the pixel electrodes, as mentioned above, are formed on the substrate. The scanning line driving circuits and the data line driving circuit are to supply scanning signals to the scanning lines and to supply image signals to the data signals, respectively, at good timing. To be specific, the scanning line driving circuits and the data line driving circuit are composed of TFTs (different from the above-mentioned TFTs, and hereinafter, "pixel switching TFTs" in order to distinguish the TFTs that constitute the driving circuits from the above-mentioned TFTs), which are switching elements, various circuit elements, and wiring lines.

Here, when a region on the substrate in which the pixel switching TFTs, the scanning lines, the data lines, and the pixel electrodes is referred to as an image display region, the driving circuits are commonly formed in a peripheral region around the image display region, in particular, in a portion adjacent to the image display region. Also, the circuit elements and the wiring lines that constitute the driving circuits are more densely arranged than the pixel switching TFTs, the scanning lines, the data lines, and the pixel electrodes. This is because it is necessary that the pixel switching TFTs, etc., are sparsely arranged in the image display region in order to secure a light transmission region. Also, this is because, although it is necessary to reduce the size of the electro-optical device having the above-mentioned structure and to thus reduce the area of the substrate, it is necessary to increase the size of the image display region. It is necessary to miniaturize the electro-optical device and to increase the size of images (that is, the size of the image display region). In such a view, in common, it is necessary to more sparsely arrange the pixel switching elements in the image display region and to more densely arrange the elements in the peripheral region around the image display region.

In a case where such a difference in density exists between the image display region and the peripheral region, when the above-mentioned CMP process is performed on the interlayer insulating film formed on both the regions, a difference in the height of the laminated structures may be caused between the image display region and the peripheral region. This is because the image display region in which the circuit elements are formed at a lower density is more easily abraded than the peripheral region in which the circuit elements are formed at a higher density. According to the inventors' experiments, the step difference (the difference of height) amounts to 100 to 200 nm.

Here, since the step difference is formed corresponding to the region in which the driving circuits are formed, the step difference is commonly formed so as to surround the image display region, specifically, so as to frame the image display region. In this construction, light interference occurs in the step difference portions so that color irregularity desired not to be displayed are generated around images to be displayed.

In order to address the above problems, an aspect of the present invention provides an electro-optical device in which the outermost surface of a laminated structure is completely planarized by appropriately performing a planarizing process, such as a CMP process, a method of manufacturing the same, and a method of manufacturing a substrate device.

In order to address the above problems, there is provided an electro-optical device including: on a substrate, data lines that extend in a certain direction and scanning lines that extend orthogonal to the data lines; switching elements to which scanning signals are supplied by the scanning lines; pixel electrodes to which image signals are supplied by the data lines via the switching elements; driving circuits arranged in a peripheral region around an image display region defined as a region in which the switching elements and the pixel electrodes are formed, and that drive the data lines and the scanning lines; and an interlayer insulating film formed on the data lines, the scanning lines, the switching elements, and the driving circuits, in the interlayer insulating film formed in the peripheral region, after an etching process is performed on at least portions corresponding to regions in which the driving circuits are formed, a planarizing process being performed on the interlayer insulating film of both the peripheral region and the image display region.

According to the electro-optical device of an aspect of the present invention, the scanning signals are supplied to the thin film transistors, which are switching elements, through the scanning lines, so that thin film transistors are on or off. The image signals are supplied to the pixel electrodes through the data lines, so that the image signals are applied and are not applied to the pixel electrodes in accordance with the on or off states of the thin film transistors, respectively. Therefore, the electro-optical device according to an aspect of the present invention can be active matrix driven.

According to an aspect of the present invention, the interlayer insulating film is formed on the switching elements, the scanning lines, and the data lines, so that it is possible to establish a laminated structure of the various components. Furthermore, in the peripheral region around the image display region in which the various components are formed, the driving circuits, such as the scanning line driving circuits and the data line driving circuit, are formed. The driving circuits are commonly composed of the circuit elements and the wiring lines. It is possible to establish the laminated structure of the circuit elements and the wiring lines.

According to an aspect of the present invention, in particular, the substrate has the image display region and the peripheral region. After etching the portions corresponding to at least the regions in which the driving circuits are formed in the interlayer insulating film formed on the peripheral region, the interlayer insulating film in both the peripheral region and the image display region is planarized. According to the electro-optical device manufactured by such processes, the outermost surface of the laminated structure is completely planarized. The above-mentioned will be described in more detail.

First, the formation density in which the circuit elements and the wiring lines that constitute the driving circuits are formed on the substrate in plan view is commonly larger than the formation density specifically, the formation density in which the various components are formed in the image display region) in which the switching elements and the pixel electrodes are formed. This is because, as mentioned above in the description of the related art, it is necessary to secure a light transmission region in the image display region and to thus sparsely arrange the switching elements. Furthermore, this is because it is necessary to reduce the size of the entire electro-optical device and to increase the size of the image display region. In a case where a difference in density exists between the image display region and the peripheral region, when a planarizing process, such as the CMP process, is performed on the interlayer insulating film formed on the two regions, a difference in height between the laminated structures of the two regions may be caused. As a result, though the planarizing process, such as the CMP process, is performed, the step difference is formed (or resides) corresponding to the region in which the driving circuits are formed, color irregularity is generated around the images to be displayed.

Therefore, according to an aspect of the present invention, before performing the planarizing process, such as the CMP process, on the interlayer insulating film, at least the portions corresponding to the regions in which the driving circuits are formed are etched in the interlayer insulating film formed in the peripheral region. As a result, corresponding to the regions in which the scanning line driving circuits and the data line driving circuit are formed, as seen from the image display region, a concave portion is formed in the outermost surface of the laminated structure. Further, according to an aspect of the present invention, subsequently, the planarizing process, such as the CMP process, is performed on both the peripheral region including the above-mentioned concave portion and the image display region.

Therefore, since the interlayer insulating film corresponding to the regions in which the driving circuits are formed is previously concaved, there is a good balance between the peripheral region and the image display region when the planarizing process, such as the CMP process, is performed on the interlayer insulating film. That is, according to an aspect of the present invention, it is possible to completely planarize both the image display region and the peripheral region.

As mentioned above, according to an aspect of the present invention, the outermost surface of the laminated structure is completely planarized by appropriately performing the planarizing process, such as the CMP process, on the interlayer insulating film.

According to an aspect of the present invention, "etching" includes wet etching in which an appropriate etchant is used and dry etching, such as reactive ion etching and reactive ion beam etching, in which an etchant is not used.

According to an aspect of the electro-optical device of the present invention, the driving circuits are composed of circuit elements and wiring lines. First formation density of the circuit elements and the wiring lines on the substrate in plan view is larger than a second formation density of the data lines, the scanning lines, the switching elements, and the pixel electrodes.

According to another aspect of the electro-optical device of the present invention, the planarizing process includes a chemical mechanical polishing (CMP) process.

The step difference is easily generated when the CMP process is used as the planarizing process. Furthermore, the CMP process is generally a technique in which the surface of a substrate to be processed contacts with the surface of an abrasive (a pad) while rotating both them and, at the same time, an abrasive solution (slurry) including silica particles is supplied to the portion in which the two surfaces contact with each other so that the surface of the substrate to be processed is abraded by a balance of a mechanical action and a chemical action to thus planarize the surface of the substrate to be processed.

An electronic apparatus according to an aspect of the present invention includes the above-mentioned electro-optical device (including various types thereof) according to an aspect of the present invention.

According to the electronic apparatus of an aspect of the present invention, since the electronic apparatus includes the above-mentioned electro-optical device according to an aspect of the present invention, for example, the outermost surface of the element substrate is completely planarized, so that it is possible to reduce or prevent a rubbing process on the alignment film from being unevenly performed and to enhance the contrast ratio of images. Therefore, it is possible to realize various electronic apparatus, such as projection type display devices (liquid crystal projectors), liquid crystal TVs, mobile telephones, electronic organizers, word processors, view finder type or monitor direct view type video tape recorders, workstations, picture telephones, POS terminals, and touch panels, capable of displaying high-quality images.

According to an aspect of the present invention, there is provided a method of manufacturing an electro-optical device including; in an image display region on a substrate, forming data lines that extend in a certain direction and scanning lines that extend orthogonal to the data lines; forming switching elements to which scanning signals are supplied by the scanning lines; forming pixel electrodes to which image signals are supplied by the data lines via the switching elements; forming driving circuits to drive the data lines and the scanning lines in a peripheral region around an image display region; forming an interlayer insulating film on the data lines, the scanning lines, the switching elements, and the driving circuits; etching at least portions corresponding to regions in which the driving circuits are formed in the interlayer insulating film formed in the peripheral region; and performing a planarizing process on the interlayer insulating film of both the peripheral region and the image display region after the etching.

According to the method of manufacturing the electro-optical device of an aspect of the present invention, it is possible to establish the laminated structure of the various components, such as the data lines, the scanning lines, the switching elements, and the pixel electrodes, and the interlayer insulating films arranged between the components. Also, in the peripheral region around the image display region in which the various components are formed, the driving circuits composed of the scanning line driving circuits and the data line driving circuit are formed. The driving circuits are commonly composed of the circuit elements and the wiring lines. It is possible to establish the laminated structure of the circuit elements and the wiring lines.

In particular, the method of manufacturing the electro-optical device according to an aspect of the present invention includes etching at least the portions corresponding to the regions in which the driving circuits are formed in the interlayer insulating film formed in the peripheral region and performing the planarizing process on both the peripheral region and the image display region after the etching. Therefore, the outermost surface of the laminated structure is completely planarized. The above-mentioned will now be described in detail.

First, the formation density in which the circuit elements and the wiring lines that constitute the driving circuits are formed on the substrate in plan view is commonly larger than the formation density (specifically, the formation density in which the various components are formed in the image display region) in which the switching elements and the pixel electrodes are formed. This is because, as mentioned above in the description of the related art, it is necessary to secure a light transmission region in the image display region and to thus sparsely arrange the switching elements. Furthermore, this is because it is necessary to reduce the size of the entire electro-optical device and to increase the size of the image display region. In a case where a difference in density exists between the image display region and the peripheral region, when the planarizing process, such as the CMP process, is performed on the interlayer insulating film formed on the two regions, a difference in height between the laminated structures of the two regions may be caused. As a result, though the planarizing process, such as the CMP process, is performed, the step difference is formed (or resides) corresponding to the regions in which the driving circuits are formed, so that color irregularity is generated around the images to be displayed.

Therefore, according to an aspect of the present invention, before performing the planarizing process, such as the CMP process, on the interlayer insulating film, in the interlayer insulating film formed in the peripheral region, at least the portions corresponding to the regions in which the driving circuits are formed are etched. As a result, corresponding to the regions in which the scanning line driving circuits and the data line driving circuit are formed, as seen from the image display region, a concave portion is formed in the outermost surface of the laminated structure. According to an aspect of the present invention, subsequently, the planarizing process, such as the CMP process, is performed on both the peripheral region including the above-mentioned concave portion and the image display region.

Therefore, since the interlayer insulating film corresponding to the regions in which the driving circuits are formed is previously concaved, there is a good balance between the peripheral region and the image display region when the planarizing process, such as the CMP process, is performed on the interlayer insulating film. According to an aspect of the present invention, it is possible to completely planarize both the image display region and the peripheral region.

As mentioned above, according to an aspect of the present invention, it is possible to completely planarize the outermost surface of the laminated structure by appropriately performing the planarizing process, such as the CMP process. Furthermore, it is possible to planarize the step difference formed on the outermost surface of the laminated structure due to (affected by) the heights of the scanning lines, the data lines, and the switching elements by performing the CMP process on the outermost surface of the laminated structure.

According to an aspect of the present invention, "etching" includes wet etching in which an appropriate etchant is used and dry etching, such as reactive ion etching and reactive ion beam etching, in which an etchant is not used.

Also, according to an aspect of the present invention, the method may further include forming storage capacitors that are connected to the switching elements and the pixel electrodes and enhance the potential maintaining characteristic of the pixel electrodes and other components as well as the switching elements, the data lines, the scanning lines, and the pixel electrodes. In this case, as the number of components provided on the substrate increase, the degree of the step difference generated in the outermost surface of the laminated structure increases. This is why the planarizing process according to an aspect of the present invention must be performed.

According to another aspect of the method of manufacturing the electro-optical device of an aspect of the present invention, the driving circuits include circuit elements and wiring lines. Forming the driving circuits may include forming the circuit elements and the wiring lines. The first formation density of the circuit elements and the wiring lines on the substrate in plan view is larger than the second formation density of the switching elements and the pixel electrodes.

According to still another aspect of the method of manufacturing the electro-optical device of an aspect of the present invention, the second formation density is defined such that the pitch between the pixel electrodes adjacent to each other is equal to or more than 15 µm.

Whether or not the step difference is generated in the regions where the driving circuits are formed is, as mentioned above, significantly affected by the first formation density in which the circuit elements and the wiring lines that constitute the driving circuits are formed and the second formation density in which the switching elements, etc., are formed in the image display region. According to the research of the inventors of the present invention, when the pitch between adjacent pixel electrodes is equal to or more than 15 µm, the second formation density is lower than the first formation density to thus increase the possibility of generating the step difference. Therefore, in such a case, according to an aspect of the present invention, the electro-optical device is manufactured by performing the planarizing process after the etching process to realize the above-mentioned effects.

Furthermore, when the pitch between adjacent pixel electrodes is less than 15 µm, for example, equal to or less than 14 µm (that is, the second formation density is higher), the step difference is not remarkably generated. When the step difference is remarkably generated, the pitch between adjacent pixel electrodes is equal to or more than 20 µm. Therefore, according to the present aspect, the pitch between adjacent pixel electrodes may be equal to or more than 20 µm, instead of 15 µm.

According to still another aspect of the method of manufacturing the electro-optical device of an aspect of the present invention, the size of the image display region is equal to or more than 1.0 inch.

Whether or not the step difference is generated in the regions in which the driving circuits are formed is, as mentioned above, significantly affected by the first formation density in which the circuit elements and the wiring lines that constitute the driving circuits are formed and the second formation density in which the switching elements, etc., are formed in the image display region. The difference between the first formation density and the second formation density is also affected by the size of the substrate or the image display region. In general, the larger the size of the image display region is, the larger the difference between the first formation density and the second formation density is. This is because, although the size of the peripheral region is considered to be uniform no matter what the size of the image display region is, the size of the image display region changes in accordance with the type of the electro-optical device.

According to the research of the inventors of the present invention, when the size of the image display region is equal to or more than 1.0 inch, the difference between the second formation density in the image display region and the first formation in the peripheral region causes the remarkable step difference. Therefore, in such a case, according to an aspect of the present invention, it is possible to realize the effects of the present invention by manufacturing the electro-optical device performing the planarizing process after the etching process.

According to still another aspect of the method of manufacturing the electro-optical device of an aspect of the present invention, the planarizing process includes a chemical mechanical polishing (CMP) process.

According to this aspect, since the planarizing process includes the CMP process, it is possible to realize the effects of the present invention. This is because the step difference is easily generated when the CMP process is used as the planarizing process. Furthermore, the CMP process is commonly a technique in which the surface of a substrate to be processed contacts with the surface of an abrasive (a pad) while rotating both them and, at the same time, an abrasive solution (slurry) including silica particles is supplied to the portion in which the two surfaces contact with each other, so that the surface of the substrate to be processed is abraded by a balance of a mechanical action and a chemical action to thus planarize the surface of the substrate to be processed.

According to still another aspect of an aspect of the method of manufacturing the electro-optical device of the present invention, in the CMP process, the applied pressure is equal to or more than 500 hPa.

According to this aspect, since the applied pressure in the CMP process is set to be equal to or more than 500 hPa, which is relatively large, it is possible to more rapidly manufacture the electro-optical device. To be specific, the applied pressure refers to the pressure applied to the processed substrate and the abrasive.

When the applied pressure is less than 500 hPa, the step difference is smoothly abraded, so that it is possible to abrade the step difference while abrading the image display region (specifically, it is possible to considerably planarize both the image display region and the peripheral region). However, when the applied pressure is less than 500 hPa, the manufacturing processes are significantly delayed. To be specific, when the applied pressure is 200 hPa, the time about four times that taken when the applied pressure is 550 hPa is taken.

As mentioned above, the condition in which the applied pressure is equal to or more than 500 hPa according to the present aspect has a meaning as a desirable value as well as a balance with the technical spirit of removing the step difference by performing etching.

According to still another aspect of the method of manufacturing the electronic apparatus of an aspect of the present invention, the pixel electrodes are arranged in a matrix in plan view. The method may include forming a mask corresponding to a shape formed by connecting the outermost edges of the pixel electrodes before the etching.

According to this aspect, the mask whose size is almost equal to the size of the image display region and that is formed so as to surround the edges of the pixel electrodes, so that the etching can be appropriately performed.

According to still another aspect of the method of manufacturing the electro-optical device of an aspect of the present invention, the method may include: prior to forming the pixel electrodes, forming a first interlayer insulating film as the forming of the interlayer insulating film; first etching at least portions corresponding to regions in which the driving circuits are formed in the first interlayer insulating film formed in the peripheral region; performing a planarizing process on the first interlayer insulating film of both the peripheral region and the image display region after the first etching; forming on the first interlayer insulating film a second interlayer insulating film as the forming of the interlayer insulating film; second etching on at least portions corresponding to regions in which the driving circuits are formed in the second interlayer insulating film formed in the peripheral region; and a second planarizing process of performing a planarizing process on the second interlayer insulating film of both the peripheral region and the image display region after the second etching, the pixel electrodes formed on the second interlayer insulating film.

According to this aspect, as the planarizing process is performed several times, the etching step is performed several times, so that it is possible to realize the effects of the present invention.

Also, according to the present aspect, before the forming the first interlayer insulating film or before forming the second interlayer insulating film after the first planarizing, for example, forming the various components, such as forming the data lines or the scanning lines and forming the switching elements, are performed.

In order to address the above problems, according to an aspect of the present invention, there is provided a method of manufacturing a substrate device in which at least one of circuit elements and wiring lines forms a laminated structure on a substrate, including: forming a low density region and a high density region in which at least one of the circuit elements and the wiring lines is formed at a lower density and at a higher density in the plan view of the substrate; forming an interlayer insulating film in the low density region and the high density region; forming a mask in a portion corresponding to the low density region on the outermost surface of the laminated structure; etching the interlayer insulating film after the forming the mask; and performing a planarizing process on the interlayer insulating film with the mask removed after the etching.

According to the method of manufacturing the substrate device of an aspect of the present invention, first, only the high density region is etched by the etching process, so that the outermost surface of the laminated structure in the high density region is concaved as seen from the low density region.

According to an aspect of the present invention, subsequently, the planarizing process, such as the CMP process, is performed on the interlayer insulating film in both the concaved high density region and the low density region.

Therefore, since the interlayer insulating film corresponding to the high density region is previously concaved, it is possible to balance the high density region with the low density region when the planarizing process, such as the CMP process, is performed. That is, according to an aspect of the present invention, it is possible to completely planarize both the low density region and the density region.

The operation and other advantages of the present invention will become apparent by the following exemplary embodiments.

DETAILED DESCRIPTION OF EXEMPLARY EMBODIMENTS

Exemplary embodiments of the present invention will now be described with reference to the accompanying drawings. According to the following exemplary embodiments, electro-optical devices according to an aspect of the present invention are applied to liquid crystal devices.

Structure of Electro-optical Device

Figure 1:
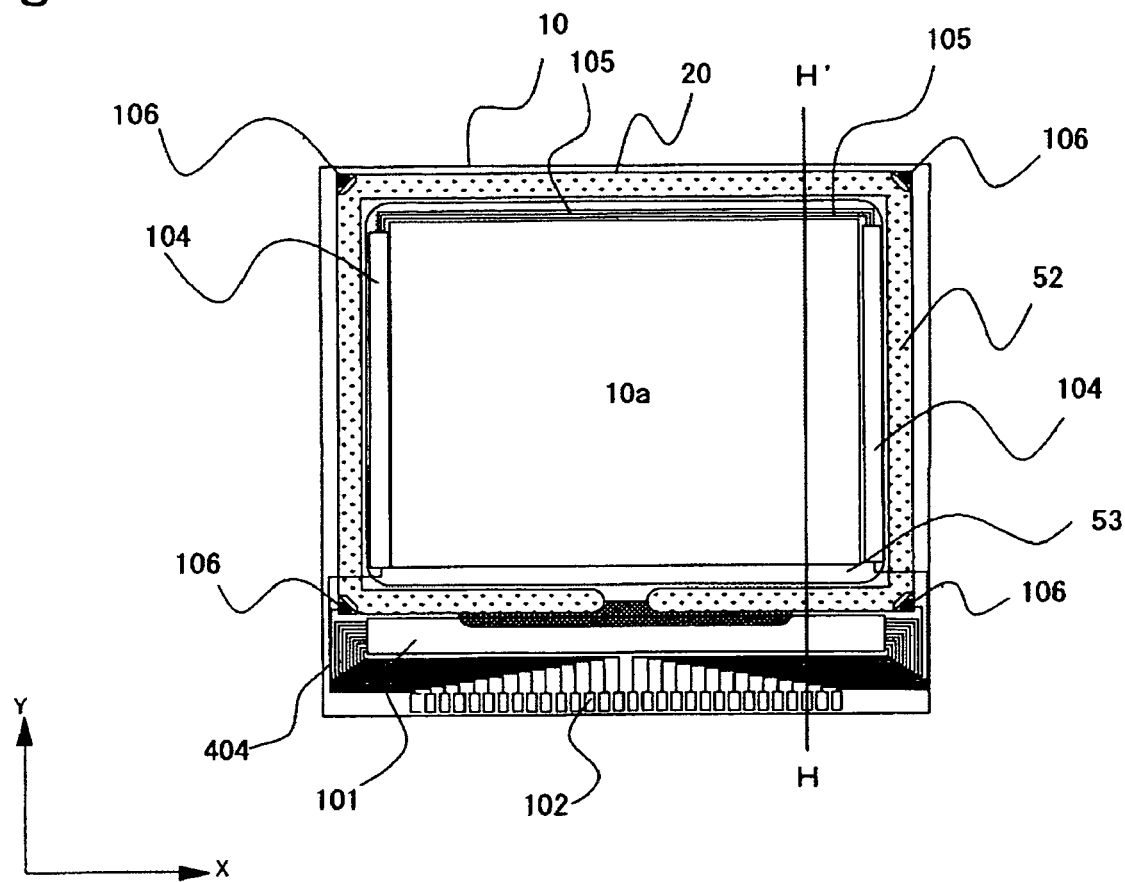
FIG. 1 is a schematic of an electro-optical device according to an aspect of the present invention, in which a TFT array substrate is seen from a counter substrate together with various components formed thereon.
Figure 2:
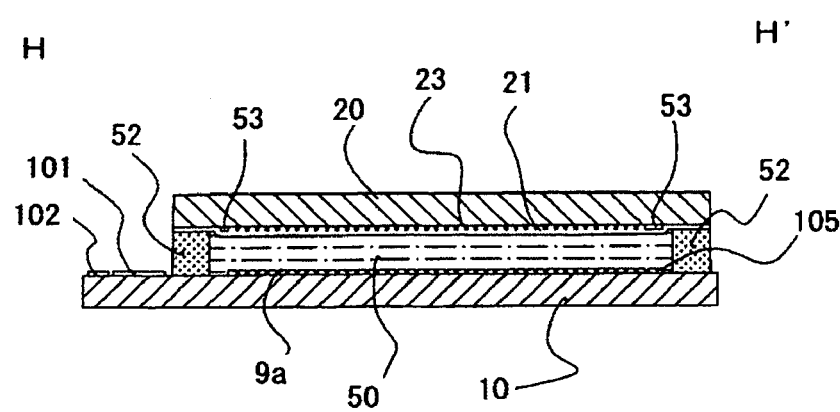
FIG. 2 is a cross-sectional schematic taken along the plane H-H' of FIG. 1.

First, the structure of an electro-optical device according to an exemplary embodiment of the present invention will now be described with reference to FIGS. 1 and 2. Here, FIG. 1 is a schematic of an electro-optical device, in which a TFT array substrate is seen from a counter substrate together with elements formed on the TFT array substrate. FIG. 2 is a cross-sectional schematic taken along the plane H-H' of FIG. 1. Here, a TFT active matrix liquid crystal device with built-in driving circuits will be taken as an example of the electro-optical device.

In FIGS. 1 and 2, in the electro-optical device according to the present exemplary embodiment, a TFT array substrate 10 and a counter substrate 20 face each other. A liquid crystal layer 50 is sealed between the TFT array substrate 10 and the counter substrate 20. The TFT array substrate 10 and the counter substrate 20 are bonded to each other by a sealing material 52 that is provided in a sealing region around an image display region 10a.

The sealing material 52 is made of an ultraviolet curable resin and a thermosetting resin in order to affix the two substrates to each other. The sealing material 52 is applied to the TFT array substrate 10, and is cured by UV irradiation, heating, etc., during the manufacturing processes. Also, gap materials, such as glass fibers or glass beads, are dispersed in the sealing material 52 so that the distance between the TFT array substrate 10 and the counter substrate 20 (a gap between the substrates) has a predetermined value. The electro-optical device according to the present exemplary embodiment for a light valve of a projector is small and is suitable for an enlarged display.

A frame light-shielding film 53 of a light-shielding performance, which defines a frame region of an image display region 10a, is provided on the counter substrate 20 side parallel to the inside of the sealing region where the sealing material 52 is arranged. A part of or all of the frame light-shielding film 53 may be provided as a light-shielding film built on the TFT array substrate 10. Also, in the present exemplary embodiment, a peripheral region is provided around the image display region 10a. In the present exemplary embodiment, in particular, as seen from the center of the TFT array substrate 10, the portion beyond the frame light-shielding film 53 is defined as the peripheral region.

In a portion of the peripheral region which is positioned outside the sealing region in which the sealing material 52 is arranged, a data line driving circuit 101 and external circuit connection terminals 102 are provided along one side of the TFT array substrate 10. In addition, scanning line driving circuits 104 are provided along the two sides adjacent to the one side so as to be covered with the frame light-shielding film 53. Furthermore, in order to connect the two scanning line driving circuits 104 provided on the two sides of the image display region 10a to each other, a plurality of wiring lines 105 are provided along the remaining one side of the TFT array substrate 10 so as to be covered with the frame light-shielding film 53.

Also, up-and-down conducting materials 106 that function as up-and-down conducting terminals between the two substrates are arranged at four corners of the counter substrate 20. Up-and-down conducting terminals are provided in regions of the TFT array substrate 10 that face the four corners. Therefore, it is possible to electrically connect the TFT array substrate 10 to the counter substrate 20.

In FIG. 2, pixel switching TFTs, wiring lines, such as scanning lines and data lines, and pixel electrodes 9a are formed on the TFT array substrate 10. An alignment film is then formed on the pixel electrodes 9a. Other than the counter electrode 21, a light-shielding film 23 in a lattice or stripe shape is formed on the counter substrate 20. An alignment film is formed on the uppermost layer. A liquid crystal layer 50 is made of liquid crystal obtained by mixing one kind or various kinds of nematic liquid crystal and is in a predetermined alignment state between the pair of alignment films.

Also, a sampling circuit to sample image signals on image signal lines and to supply the sampled image signals to the data lines, a pre-charge circuit to supply a predetermined voltage level of pre-charge signals to the plurality of data lines prior to the image signals, and a test circuit to test the quality and the defect of the electro-optical device during manufacturing or forwarding may be formed on the TFT array substrate 10 illustrated in FIGS. 1 and 2, in addition to the data line driving circuit 101 and the scanning line driving circuits 104.

Structure of Pixel Portion

Figure 3:
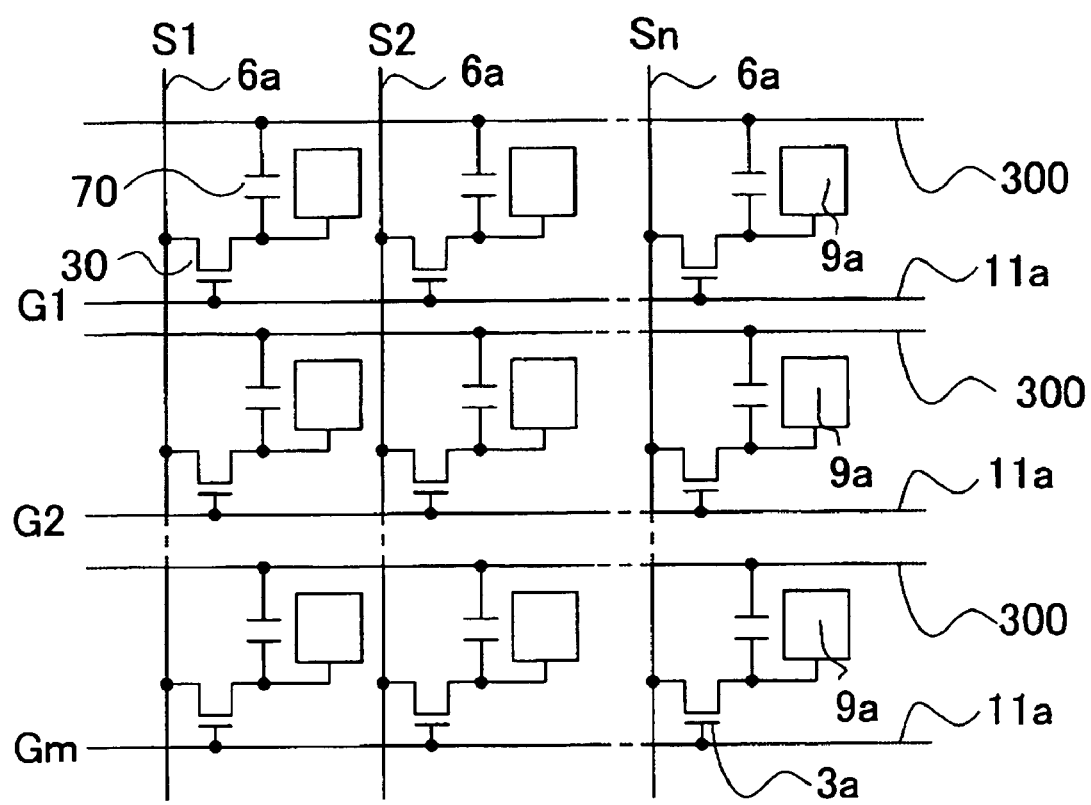
FIG. 3 illustrates an equivalent circuit schematic for various elements and wiring lines in a plurality of pixels in a matrix, which constitutes an image display region of the electro-optical device.
Figure 4:
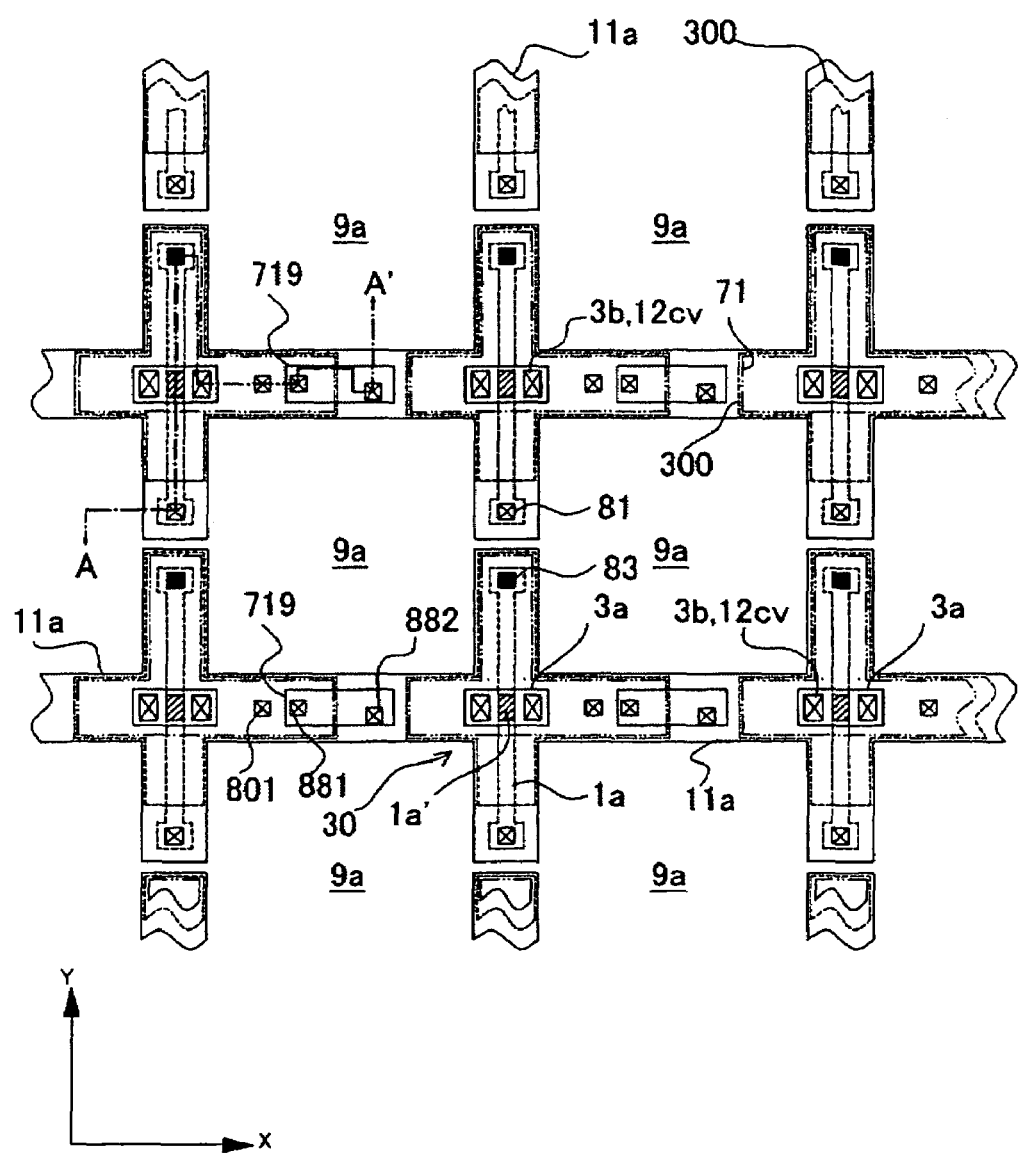
FIG. 4 is a schematic of the structure of a lower layer (the lower layer from the bottom to reference numeral 70 (a storage capacitor) in FIG. 6) of a plurality of adjacent pixels on the TFT array substrate on which data lines, scanning lines, and pixel electrodes are formed.
Figure 5:
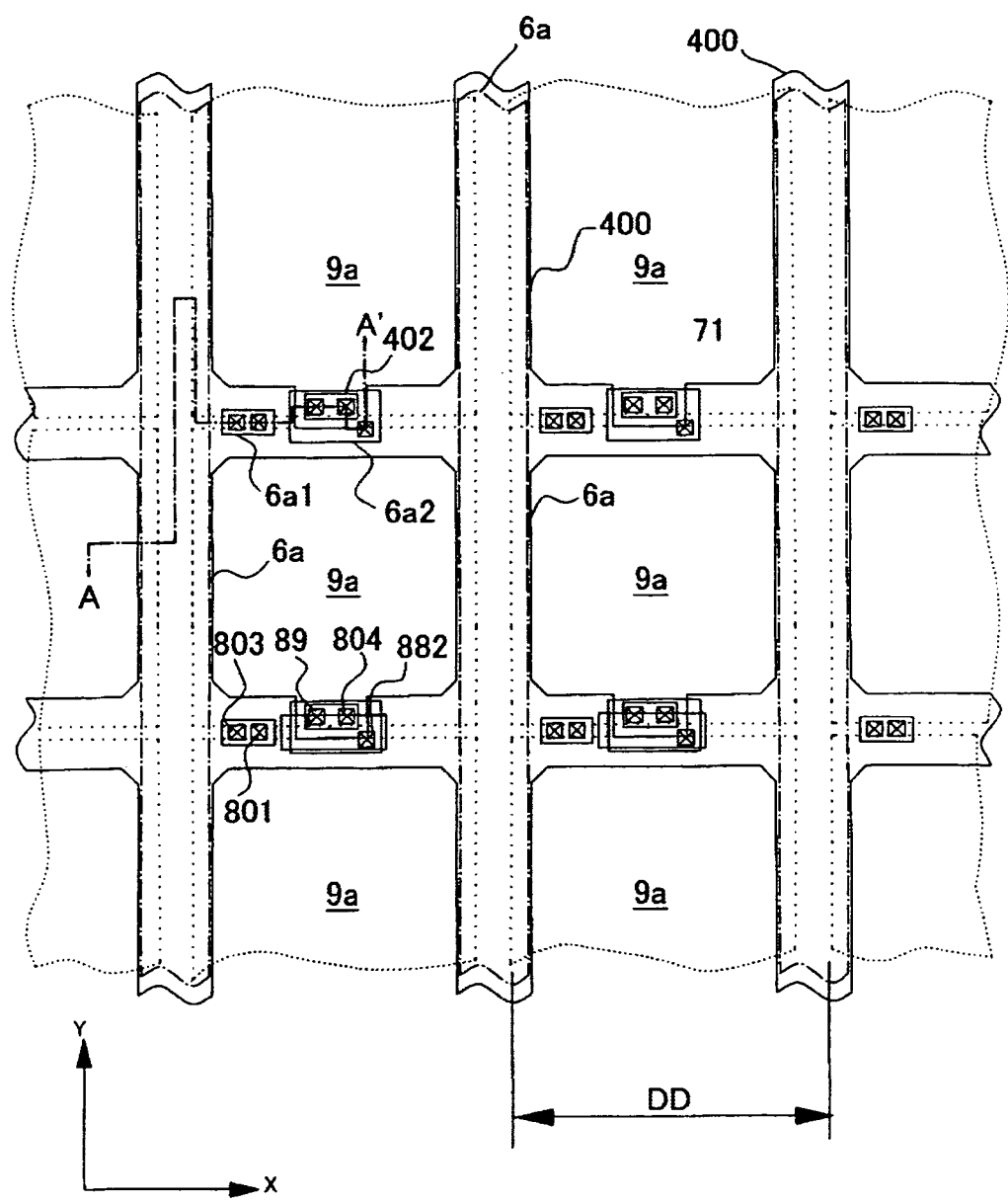
FIG. 5 is a schematic of the structure of an upper layer (the upper layer from above reference numeral 70 (the storage capacitor) to the top in FIG. 6) of the plurality of adjacent pixels on the TFT array substrate on which the data lines, the scanning lines, and the pixel electrodes are formed.

The structure of the pixel portion in the electro-optical device according to the present exemplary embodiment of the present invention will now be described with reference to FIGS. 3 to 6. Here, FIG. 3 illustrates an equivalent circuit schematic for various elements and wiring lines in the plurality of pixels formed in a matrix, which constitutes the image display region of the electro-optical device. FIGS. 4 and 5 are schematics of a plurality of pixel groups adjacent to each other on the TFT array substrate on which the data lines, the scanning lines, and the pixel electrodes are formed. Also, FIGS. 4 and 5 respectively illustrate a lower layer portion (FIG. 4) and an upper layer portion (FIG. 5) in a laminated structure, which will be described later.

Figure 6:
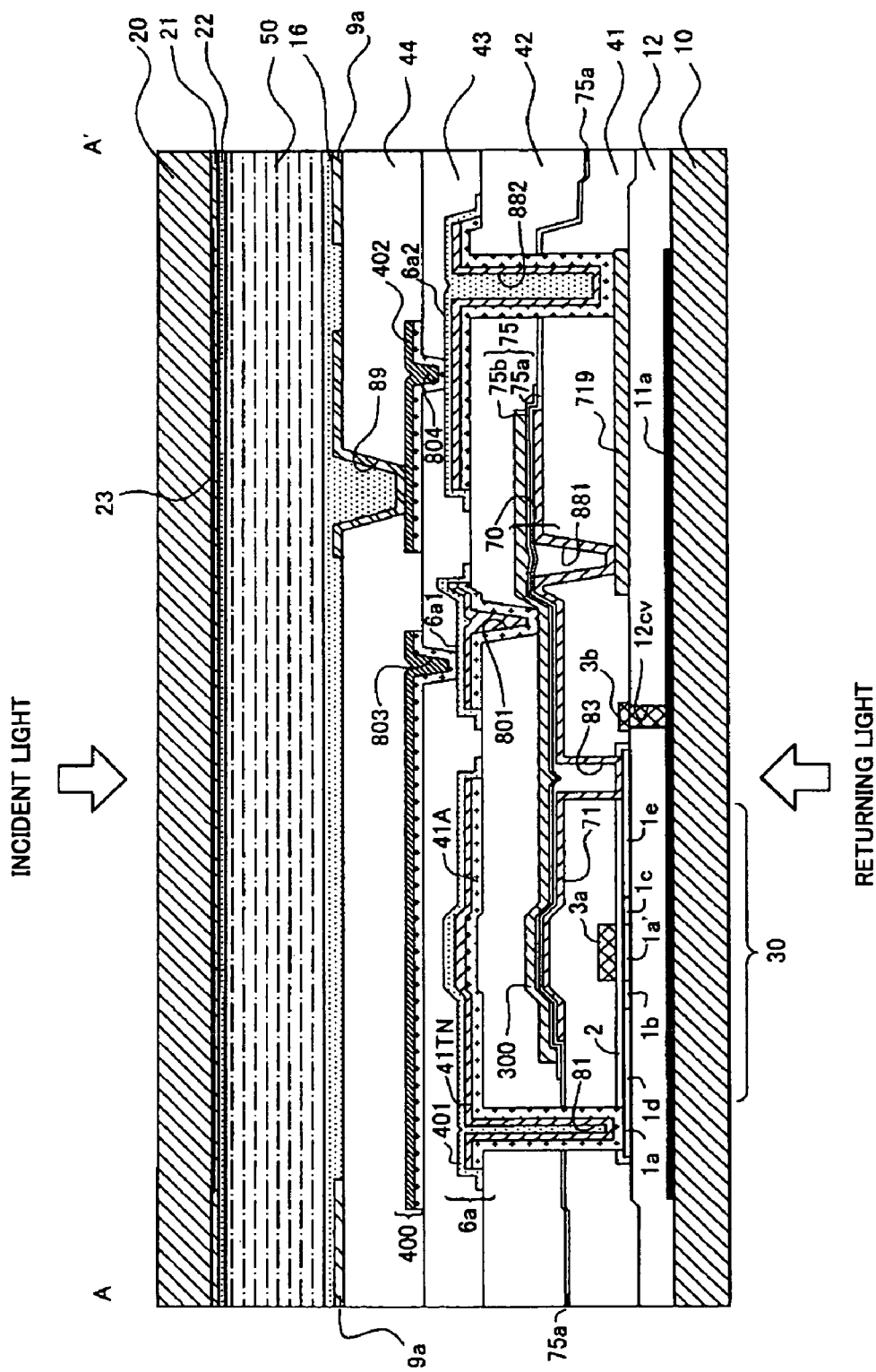
FIG. 6 is a cross-sectional schematic taken along the plane A-A' when FIG. 4 overlaps FIG. 5.

FIG. 6 is a cross-sectional schematic taken along the plane A-A' when FIGS. 4 and 5 overlap with each other. In addition, in FIG. 6, the scales of the respective layers and members are different from each other so that the layers and members can be recognized in the drawing.

Circuit Structure of Pixel Portion

In FIG. 3, in a plurality of pixels in a matrix, which constitutes the image display region of the electro-optical device according to an aspect of the present invention, the pixel electrodes 9a and TFTs 30 to switch the pixel electrodes 9a are formed. Data lines 6a to which image signals are supplied are electrically connected to sources of the TFTs 30. The image signals S1, S2, . . . , and Sn written in the data lines 6a may be line-sequentially supplied in order or may be supplied to each group of the plurality of data lines 6a adjacent to each other.

Gate electrodes 3a are electrically connected to the gates of the TFTs 30. Scanning signals G1, G2, . . . , and Gm are line-sequentially applied to scanning lines 11a and the gate electrodes 3a in pulse in this order at predetermined timing. The pixel electrodes 9a are electrically connected to drains of the TFTs 30 and switch off the TFTs 30, which are switching elements, for a certain period of time to write the image signals S1, S2, . . . , and Sn supplied from the data lines 6a at predetermined timing.

A predetermined level of image signals S1, S2, . . . , and Sn that are written in liquid crystal, which is an example of an electro-optical material, through the pixel electrodes 9a are held between the pixel electrodes 9a and the counter electrode formed on the counter substrate for a certain period of time. The liquid crystal modulates light by changing the alignment or the order of molecules sets by an applied voltage level to allow grayscale display. In a normally white mode, the transmittance of incident light is reduced corresponding to the voltage applied to each pixel. Furthermore, in a normally black mode, the transmittance of incident light increases corresponding to the voltage applied to each pixel. Therefore, in general, light components having contrasts corresponding to the image signals are emitted from the electro-optical device.

Here, in order to reduce or prevent the held image signals from leaking, storage capacitors 70 are additionally provided in parallel with liquid crystal capacitors formed between the pixel electrodes 9a and the counter electrode. The storage capacitors 70 are provided parallel to the scanning lines 11a and include capacitance electrodes connected to fixed potential and capacitance electrodes 300 fixed to electrostatic potential.

Detailed Structure of Pixel Portion

The detailed structure of the electro-optical device in which the above-mentioned circuit operation is realized by the data lines 6a, the scanning lines 11a, the gate electrodes 3a, and the TFTs 30 will now be described with reference to FIGS. 4 to 6.

First, in FIG. 5, the plurality of pixel electrodes 9a (whose outlines are marked with dotted lines) is provided on the TFT array substrate 10 in a matrix. The data lines 6a and the scanning lines 11a are provided along the vertical and horizontal boundaries of the pixel electrodes 9a. The data lines 6a have a laminated structure including an aluminum film as mentioned later. The scanning lines 11a are composed of, for example, a conductive polysilicon film. Also, the scanning lines 11a are electrically connected to the gate electrodes 3a that face channel regions 1a', marked with oblique lines which are upwardly slanted to the right in the drawing, in semiconductor layers 1a through contact holes 12cv. The gate electrodes 3a are included in the scanning lines 11a. The pixel switching TFTs 30 are provided in the channel regions 1a', specifically, in the intersections between the gate electrodes 3a and the data lines 6a so as to be opposite to the gate electrodes 3a that are included in the scanning lines 11a. Therefore, the TFTs 30 (excluding the gate electrodes) are provided between the gate electrodes 3a and the scanning lines 11a.

Next, as illustrated in FIG. 6 that is a cross-sectional schematic taken along the plane A-A' of FIGS. 4 and 5, the electro-optical device includes the TFT array substrate 10 composed of, for example, a quartz substrate, a glass substrate, or a silicon substrate, and the counter substrate 20 that is composed of, for example, a glass substrate or a quartz substrate and is arranged to opposite to the TFT array substrate 10.

As illustrated in FIG. 6, the pixel electrodes 9a are provided on the side of the TFT array substrate 10. An alignment film 16 subjected to a predetermined alignment process, such as a rubbing process, is provided on the pixel electrodes 9a. The pixel electrodes 9a are composed of, for example, a transparent conductive film, such as an ITO film. A counter electrode 21 is provided on the entire surface of the counter substrate 20. An alignment film 22 subjected to a predetermined alignment process, such as a rubbing process, is provided on the counter electrode 21. The counter electrode 21, as in the pixel electrodes 9a, is composed of a transparent conductive film, such as an ITO film.

As mentioned above, between the TFT array substrate 10 and the counter substrate 20 opposite to the TFT array substrate 10, an electro-optical material, such as liquid crystal, is injected and sealed in a space surrounded by the sealing material 52 (see FIGS. 1 and 2) to form a liquid crystal layer 50. The liquid crystal layer 50 is in a predetermined alignment state by the alignment films 16 and 22 in a state where an electric filed is not applied to the pixel electrodes 9a.

Various components including the pixel electrodes 9a and the alignment film 16 are laminated on the TFT array substrate 10. As illustrated in FIG. 6, the laminated structure includes a first layer including the scanning lines 11a, a second layer including the TFTs 30 including the gate electrodes 3a, a third layer including the storage capacitors 70, a fourth layer including the data lines 6a, a fifth layer including capacitive wiring lines 400, and a sixth layer (the uppermost layer) including the pixel electrodes 9a and the alignment film 16. Also, a base insulating film 12 is provided between the first layer and the second layer, a first interlayer insulating film 41 is provided between the second layer and the third layer, a second interlayer insulating film 42 is provided between the third layer and the fourth layer, a third interlayer insulating film 43 is provided between the fourth layer and the fifth layer, and a fourth interlayer insulating film 44 is provided between the fifth layer and the sixth layer to reduce the likelihood or prevent the above-mentioned components from being short-circuited. In addition, in the insulating films 12, 41, 42, 43, and 44, for example, contact holes to electrically connect high-concentration source regions 1d in the semiconductor layers 1a of the TFTs 30 to the data lines 6a are formed. Hereinafter, the respective components will be described in the order from the bottom. Also, among the above, a lower layer portion, from the first layer to the third layer, is illustrated in FIG. 4, and an upper layer portion, from the fourth layer to the sixth layer, is illustrated in FIG. 5.

Laminated Structure: Structure of First Layer Including—Scanning Lines, etc.

First, the scanning lines 11a composed of a simple metal substance including at least one of the metallic materials having a high melting point, such as Ti, Cr, W, Ta, and Mo, an alloy thereof, metal silicide, polysilicide, a laminated structure thereof, or a conductive polysilicon are provided in the first layer. The scanning lines 11a are patterned in stripe shapes along the X direction of FIG. 4 in plan view. Specifically, the scanning lines 11a in stripe shapes include main lines that extend along the X direction of FIG. 4 and protrusions that extend to the Y direction of FIG. 4 in which the data lines 6a or the capacitive wiring lines 400 extend. The protrusions that extend from the adjacent scanning lines 11a are not connected to each other. The scanning lines 11a are separated from each other by lines.

Laminated Structure: Structure of Second Layer—TFTs, etc.

Next, the TFTs 30 including the gate electrodes 3a are provided in the second layer. As illustrated in FIG. 6, the TFTs 30 have a lightly doped drain (LDD) structure, and each of them includes the gate electrode 3a, the channel region 1a' of the semiconductor layer 1a, which is composed of, for example, a polysilicon film and in which a channel is formed by the electric field from the gate electrode 3a, an insulating film 2 including a gate insulating film for insulating the gate electrode 3a and the semiconductor layer 1a, and a low-concentration source region 1b, a low-concentration drain region 1c, a high-concentration source region 1d, and a high-concentration drain region 1e in the semiconductor layer 1a.

Further, according to the present exemplary embodiment, relay electrodes 719 are formed of the same film as the gate electrodes 3a in the second layer. As illustrated in FIG. 4, each of the relay electrodes 719 is isolated so as to be substantially in the middle of one side of the pixel electrodes 9a that extends to the X direction in plan view. According to the present exemplary embodiment, the relay electrodes 719 and the gate electrodes 3a are formed of the same film. Therefore, when the gate electrodes 3a are composed of, for example, a conductive polysilicon film, the relay electrodes 719 are also composed of the conductive polysilicon film.

As illustrated in FIG. 6, the TFTs 30 may have the LDD structure. However, they may have an offset structure in which impurities are not implanted into the low-concentration source regions 1b and the low-concentration drain regions 1c. Also, the TFTs 30 may be self-aligned TFTs in which high-concentration impurities are implanted using the gate electrodes 3a as masks and high-concentration source regions and drain regions are formed by self-alignment.

Laminated Structure: Structure between First Layer and Second Layer—Base Insulating Film A base insulating film 12 composed of, for example, a silicon oxide film is provided on the scanning lines 11a and under the TFTs 30. The base insulating film 12 insulates the TFTs 30 from the scanning lines 11a and is formed on the entire surface of the TFT array substrate 10 to reduce or prevent a change in the characteristics of the pixel switching TFTs 30 due to roughness caused by abrading the surface of the TFT array substrate 10 and the dirt that remains after cleaning the TFT array substrate 10.

In the base insulating film 12, grooved contact holes 12cv are formed along the direction of the length of the channel of the semiconductor layer 1a that extends along data lines 6a, which will be described later, at both sides of the semiconductor layer 1a in plan view. The gate electrodes 3a laminated on the contact holes 12cv have concave portions underneath. Also, the gate electrodes 3a are formed to fill the entire contact holes 12cv so that side walls 3b integrally formed with the gate electrodes 3a extend from the gate electrodes 3a. Therefore, as illustrated in FIG. 4, the semiconductor layer 1a of the TFT 30 is covered from the side in plan view, and it is possible to reduce or prevent light from being incident at least from the semiconductor layer 1a.

The side walls 3b are formed so as to fill the contact holes 12cv so that the lower ends thereof contact the scanning lines 11a. Here, as mentioned above, since the scanning lines 11a are in stripe shape, the gate electrode 3a and the scanning line 11a in each row have the same potential as those in the corresponding row.

Laminated Structure: Structure of Third Layer—Storage Capacitors, etc.

The storage capacitors 70 are provided in the third layer following the second layer. Each of the storage capacitors 70 is formed so that a lower electrode 71, functioning as a pixel potential side capacitive electrode connected to the high-concentration drain region 1e of the TFT 30 and the pixel electrode 9a, and the capacitive electrode 300, functioning as a fixed potential side capacitive electrode, face each other with a dielectric film 75 interposed. According to the storage capacitors 70, it is possible to enhance the potential holding characteristics of the pixel electrodes 9a. As can be seen from FIG. 4, since the storage capacitor 70 according to the present exemplary embodiment is formed so as not to reach the light-transmitting region almost corresponding to the region in which the pixel electrode 9a is formed (that is, the storage capacitor 70 is formed so as to be in the light-shielding region), it is possible to maintain a larger pixel aperture ratio of the entire electro-optical device and to display bright images.

Specifically, the lower electrodes 71 are composed of, for example, a conductive polysilicon film and function as the pixel potential side capacitive electrodes. The lower electrodes 71 may be composed of a single layer film or a multi-layer film including a metallic material or an alloy. The lower electrodes 71 function as the pixel potential side capacitive electrodes and relay-connect the pixel electrode 9a to the high-concentration drain regions 1e of the TFTs 30. Furthermore, the relay connection mentioned here is performed through the relay electrodes 719.

The capacitive electrodes 300 function as the fixed potential side capacitive electrodes of the storage capacitors 70. According to the present exemplary embodiment, in order to make the capacitive electrodes 300 have fixed potential, the capacitive electrodes 300 may be electrically connected to the capacitive wiring lines 400, which will be mentioned later, having fixed potential. The capacitive electrodes 300 are formed of a single metal substance including at least one of the metallic materials having a high melting point, such as Ti, Cr, W, Ta, and Mo, an alloy thereof, metal silicide, poly silicide, a laminated structure thereof, or tungsten silicide. Therefore, the capacitive electrodes 300 shield the light incident on the TFTs.

As illustrated in FIG. 6, the dielectric film 75 is composed of a silicon oxide film, such as a high temperature oxide (HTO) film or a low temperature oxide (LTO) film, or a silicon nitride film, the above films having a relatively thin thickness, for example, of about 5 to 200 nm. In order to increase the capacitance of the storage capacitors 70, the thinner the dielectric film 75, the better as long as it is possible for them to be reliable.

In the present exemplary embodiment, as illustrated in FIG. 6, the dielectric film 75 has a two-layered structure in which a lower layer is a silicon oxide film 75a and an upper layer is a silicon nitride film 75b. The silicon nitride film 75b on the upper layer is patterned so as to be slightly larger than or equal to the lower electrode 71 of the pixel potential side capacitive electrode to be in a light-shielding region (a non-aperture region).

Also, in the present exemplary embodiment, the dielectric film 75 has the two-layered structure. However, the dielectric film 75 may have a three-layered structure of a silicon oxide film, a silicon nitride film, and a silicon oxide film, or more than a three-layered structure. The dielectric film 75 may have a single layered structure.

Laminated Structure: Structure between Second Layer and Third Layer—First Interlayer Insulating Film The first interlayer insulating film 41 composed of a silicate glass film, such as a non-silicate glass (NSG) film, a phosphor silicate glass (PSG) film, a boron silicate glass (BSG) film, or a boron phosphor silicate glass (BPSG) film, a silicon nitride film, a silicon oxide film, or, a NSG film is formed on the TFTs 30, the gate electrodes 3a, and the relay electrodes 719 and under the storage capacitors 70.

The contact holes 81 to electrically connect the high-concentration source regions 1d of the TFTs 30 to the data lines 6a, which will be described later, are formed in the first interlayer insulating film 41 so as to pass through the second interlayer insulating film 42, which will be described later. Also, in the first interlayer insulating film 41, contact holes 83 to electrically connect the high-concentration drain regions 1e of the TFTs 30 to the lower electrodes 71 that constitute the storage capacitors 70 are formed. Moreover, in the first interlayer insulating film 41, contact holes 881 to electrically connect the relay electrodes 719 to the lower electrodes 71 as the pixel potential side capacitive electrodes that constitute the storage capacitors 70 are formed. Furthermore, in the first interlayer insulating film 41, contact holes 882 to electrically connect the relay electrodes 719 to second relay electrodes 6a2, which will be described later, are formed so as to pass through the second interlayer insulating film, which will be described later.

Laminated Structure: Structure of Fourth Layer—Data Lines, etc.

In the fourth layer following the above-mentioned third layer, the data lines 6a are provided. As illustrated in FIG. 6, the data line 6a is composed of a three-layered film of an aluminum layer (refer to as reference numeral 41A in FIG. 6), a titan nitride layer (refer to as reference numeral 41TN in FIG. 6), and a silicon nitride layer (refer to as reference numeral 401 in FIG. 6) in the order from the bottom layer. The silicon nitride film is patterned to be slightly larger than the aluminum layer and the titan nitride layer underneath so as to cover the aluminum layer and the titan nitride layer.

Also, in the fourth layer, a relay layer 6a1 for capacitive wiring lines and a second relay electrode 6a2 are formed of the same film as the data lines 6a. As illustrated in FIG. 5, the relay layer 6a1 and the second relay electrode 6a2 are not formed so as to be connected to the data lines 6a and to be plane but so as to be separated from each other in the patterning. For example, when attention is paid to the data line 6a on the leftmost side in FIG. 5, on the right side thereof, the substantially rectangular relay layer 6a1 for the capacitive wiring line is formed. Also, on the right side thereof, the substantially rectangular second relay electrode 6a2 having an area slightly larger than that of the relay layer 6a1 for the capacitive wiring line is formed.

Furthermore, since the relay layer 6a1 for the capacitive wiring line and the second relay electrode 6a2 are formed of the same film as the data lines 6a, the relay layer 6a1 and the second relay electrode 6a2 each have a three-layered structure of an aluminum layer, a titan nitride layer, and a plasma nitride layer in the order from the bottom layer.

Laminated Structure: Structure between Third Layer and Fourth Layer—Second Interlayer Insulating Film The second interlayer insulating film 42 composed of a silicate glass film, such as a NSG film, a PSG film, a BSG film, or a BPSG film, a silicon nitride film, a silicon oxide film, etc., or formed by a plasma CVD method using a TEOS gas, is formed on the storage capacitors 70 and under the data lines 6a. In the second interlayer insulating film 42, the above-mentioned contact holes 81 to electrically connect the high-concentration source regions 1d of the TFTs 30 to the data lines 6a are formed. In addition, contact holes 801 to electrically connect the relay layers 6a1 for the capacitive wiring lines to the capacitive electrodes 300, which are the upper electrodes of the storage capacitors 70, are formed. Furthermore, in the second interlayer insulating film 42, the above-mentioned contact holes 882 for electrically connecting the second relay electrodes 6a2 to the relay electrodes 719 are formed.

Laminated Structure: Structure of Fifth Layer—Capacitive Wiring Lines, etc.

In the fifth layer following the fourth layer, capacitive wiring lines 400 are formed. As illustrated in FIG. 5, the capacitive wiring lines 400 extend along the X direction and the Y direction so as to be formed of a lattice shape. In the capacitive wiring lines 400, in particular, the portions that extend in the Y direction in the drawing have a width larger than that of the data lines 6a so as to cover the data lines 6a. Also, the portions of the capacitive wiring lines that extend in the direction X in the drawing have notch portions in the center of one side of each of the pixel electrodes 9a in order to secure regions in which third relay electrodes 402, which will be described later, are formed.

Furthermore, in FIG. 5, in the corners of the intersections of the capacitive wiring lines 400 that extend in the X and Y directions, substantially triangular portions are formed so as to fill the corners. Since the substantially triangular portions are formed in the capacitive wiring lines 400, it is possible to effectively shield light incident on the semiconductor layer 1a of the TFT 30. The light diagonally incident on the semiconductor layer 1a is reflected by or absorbed to the triangular portions and does not reach the semiconductor layer 1a. Therefore, it is possible to reduce or prevent light leakage current from being generated in the semiconductor layer 1a and to display high-quality images without flickers. The capacitive wiring lines 400 extend from the image display region 10a in which the pixel electrodes 9a are arranged to the periphery of the image display region 10a and are electrically connected to an electrostatic potential source. Therefore, fixed potential is applied to the capacitive wiring lines 400.

In the fourth layer, third relay electrodes 402 are formed of the same film as the capacitive wiring lines 400. Each of the third relay electrodes 402 relays the electrical connection between the second relay electrode 6a2 and the pixel electrode 9a through contact holes 804 and 89, which will be mentioned later. In addition, the capacitive wiring lines 400 and the third relay electrodes 402 are not connected to each other in plan view, but are separated from each other in patterning.

Furthermore, each of the above-mentioned capacitance wiring lines 400 and the third relay electrodes 402 has a two-layered structure of a lower aluminum layer and an upper titan nitride layer.

Laminated Structure: Structure between Fourth Layer and Fifth Layer—Third Interlayer Insulating Film A third interlayer insulating film 43 composed of a silicate glass film, such as a NSG film, a PSG film, a BSG film, or a BPSG film, a silicon nitride film, a silicon oxide film, etc., or formed by the plasma CVD method using a TEOS gas, is formed on the above-mentioned data lines 6a and under the capacitive wiring lines 400. In the third interlayer insulating film 43, contact holes 803 to electrically connect the above-mentioned capacitive wiring lines 400 to the relay layer 6a1 for the capacitive wiring lines, and contact holes 804 to electrically connect the third relay electrodes 402 to the second relay electrodes 6a2 are formed.

Laminated Structure: Structures of Sixth Layer and Structure between Fifth Layer and Sixth Layer—Pixel Electrodes, etc.

Finally, in the sixth layer, as mentioned above, the pixel electrodes 9a are formed in a matrix. The alignment film 16 is formed on the pixel electrodes 9a. A fourth interlayer insulating film 44 composed of a silicate glass film, such as a NSG film, a PSG film, a BSG film, or a BPSG film, a silicon nitride film, a silicon oxide film, or a NSG film is formed under the pixel electrodes 9a. In the fourth interlayer insulating film 44, contact holes 89 to electrically connect the pixel electrodes 9a to the above-mentioned third relay electrodes 402 are formed. The pixel electrode 9a and the TFT 30 are electrically connected to each other through the contact hole 89, the third relay layer 402, the above-mentioned contact hole 804, the second relay layer 6a2, the contact hole 882, the relay electrode 719, the contact hole 881, the lower electrode 71, and the contact hole 83.

Laminated Structure: Structures of Components in Peripheral Region—CMOS-type TFTs, etc.

The structure of the above-mentioned pixel portions is common to each pixel portion as illustrated in FIGS. 4 and 5. In the image display region 10a illustrated with reference to FIGS. 1 and 2, the structure of such a pixel portion is periodically formed. In such an electro-optical device, in the peripheral region around the image display region 10a, as illustrated with reference to FIGS. 1 and 2, the driving circuits, such as the scanning line driving circuits 104 and the data line driving circuit 101, are formed. Also, the scanning line driving circuits 104 and the data line driving circuit 101 are composed of, for example, a plurality of TFTs as switching elements illustrated in FIG. 7 and wiring lines. Here, FIG. 7 is a cross-sectional schematic illustrating the actual structure of a CMOS-type TFT 202, which is an example of a switching element formed in the peripheral region.

Figure 7:
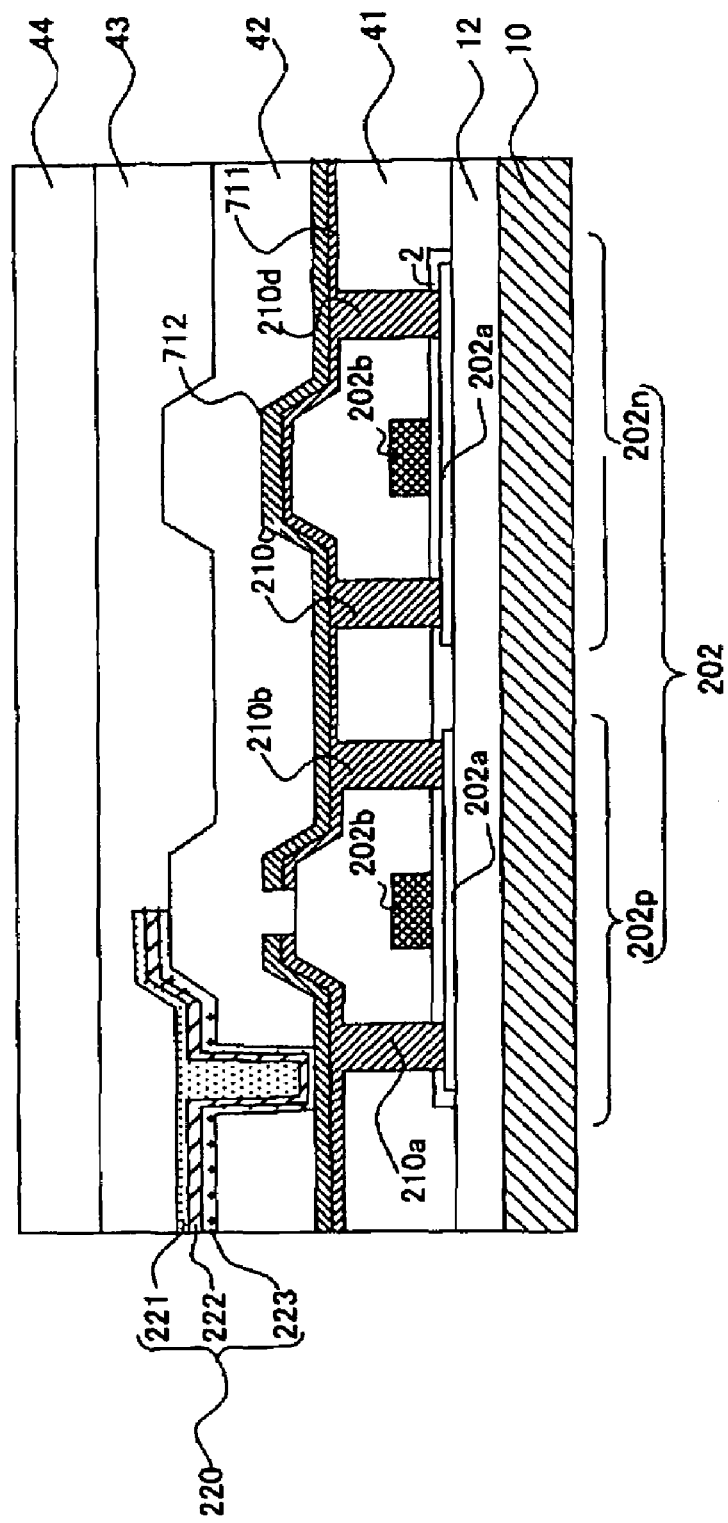
FIG. 7 is a cross-sectional schematic illustrating the structure of a CMOS-type TFT on a peripheral region.

In FIG. 7, the CMOS-type TFT 202 includes a p-type TFT 202p and an n-type TFT 202n. Each of the p-type TFT 202p and the n-type TFT 202n is composed of a semiconductor layer 202a, an insulating film 2, a gate electrode film 202b, various electrodes 210a to 210d connected to the drain and the source of the semiconductor layer 202a, and wiring lines 220. In FIG. 7, as noted from the components denoted by reference numerals 12, 41, 42, 43, and 44, the CMOS-type TFT 202 and structures provided thereon are formed in the same process as the structures in the pixel portions illustrated in FIG. 6 (refer to FIGS. 8 and 9 that illustrate a method of manufacturing the electro-optical device according to the present invention). The semiconductor layer 202a is formed in the same process as the semiconductor layer 1a of the TFT 30. The gate electrode film 202b is formed in the same process as the gate electrode 3a. Also, in FIG. 7, wiring line films 711 and 712 formed in the same process as the lower electrode 71 and the capacitive electrode 300 that constitute the storage capacitor 70 in FIG. 6 constitute the various electrodes 210a to 210d. In addition, in FIG. 7, wiring line films 221 to 223 formed in the same process as the three-layered film (the aluminum film 41A, the titan nitride film 41TN, and the silicon nitride film 4401) that constitutes the data line 6a in FIG. 6 constitute the wiring line 220. Furthermore, although not shown in FIG. 7, a thin film can be formed in the same process as the capacitive wiring lines 400 of FIG. 6 so that the thin film constitutes a part of the CMOS-type TFT 202 (for example, the thin film can be used as wiring lines).

As mentioned above, in a case where the components in the pixel portions and the various circuit elements, such as the CMOS-type TFTs 202, and the wiring lines in the peripheral region are formed in the same process, it is possible to simplify the manufacturing processes and to omit some of the manufacturing processes compared with a case in which they are separately formed.

According to the present exemplary embodiment, in particular, the outermost surface of the laminated structure on the peripheral region including the CMOS-type TFTs 202 on the peripheral region and the outermost surface of the laminated structure (refer to FIG. 6) on the above-mentioned image display region 10a are completely planarized. This is because, as mentioned hereinafter, the manufacturing method according to the present exemplary embodiment is adopted. Hereinafter, the above-mentioned will be described with respect to another item.

Method of Manufacturing Electro-Optical Device

The manufacturing processes of the electro-optical device according to the above-mentioned exemplary embodiment will now be described with reference to FIGS. 8 to 10. Here, FIGS. 8 to 10 sequentially illustrate the laminated structure of the electro-optical device in the respective manufacturing processes with reference to the cross-sectional schematic of FIG. 6 and the cross-sectional view of the CMOS-type TFT 202 of FIG. 7 (the former is illustrated on the right side, and the latter is illustrated on the left side in the drawing). Also, FIG. 10 is a schematic illustrating that a plurality of electro-optical devices according to the present exemplary embodiment is simultaneously formed on a large glass substrate. Hereinafter, in particular, the manufacturing processes after the process of forming the third interlayer insulating film 43 according to the present exemplary embodiment will be described in detail. The previous processes of forming the scanning lines 11a, the semiconductor layer 1a, the gate electrodes 3a, the storage capacitors 70, and the data lines 6a will be omitted.

Figure 8:
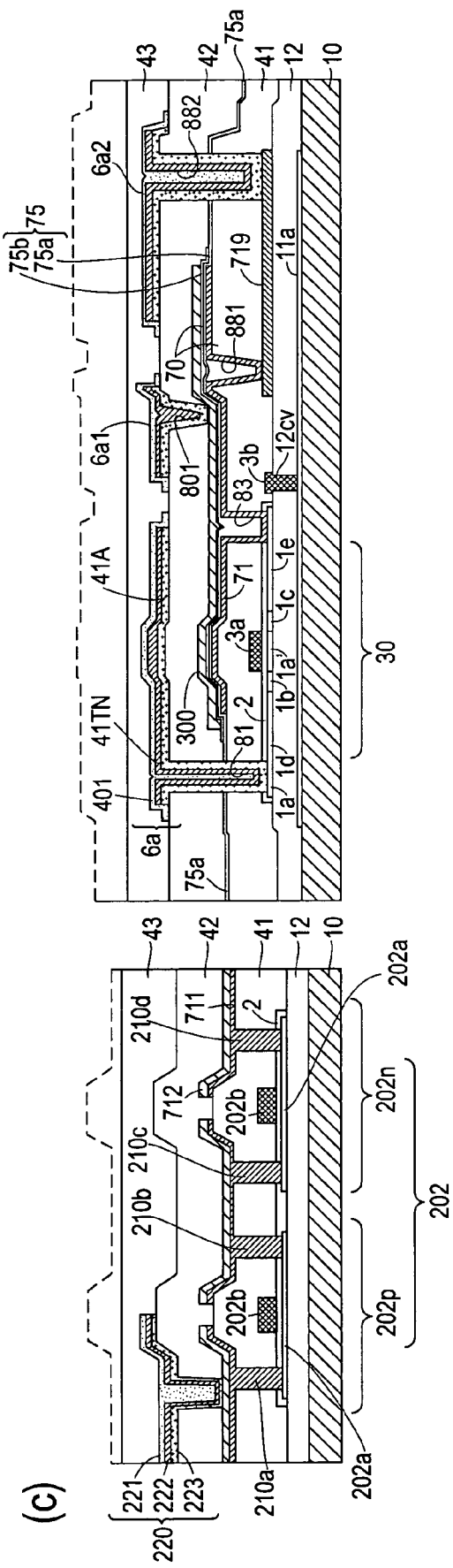
FIG. 8 is a cross-sectional schematic sequentially illustrating the processes (a) to (d) of a method of manufacturing the electro-optical device according to the present exemplary embodiment.
Figure 8:
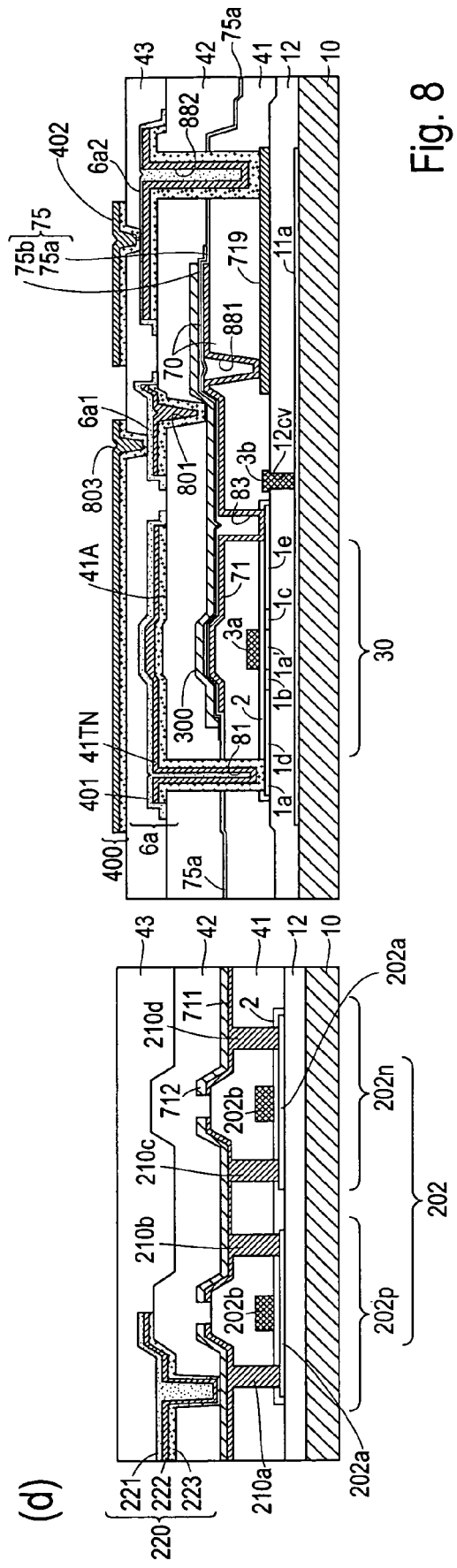
Figure 9:
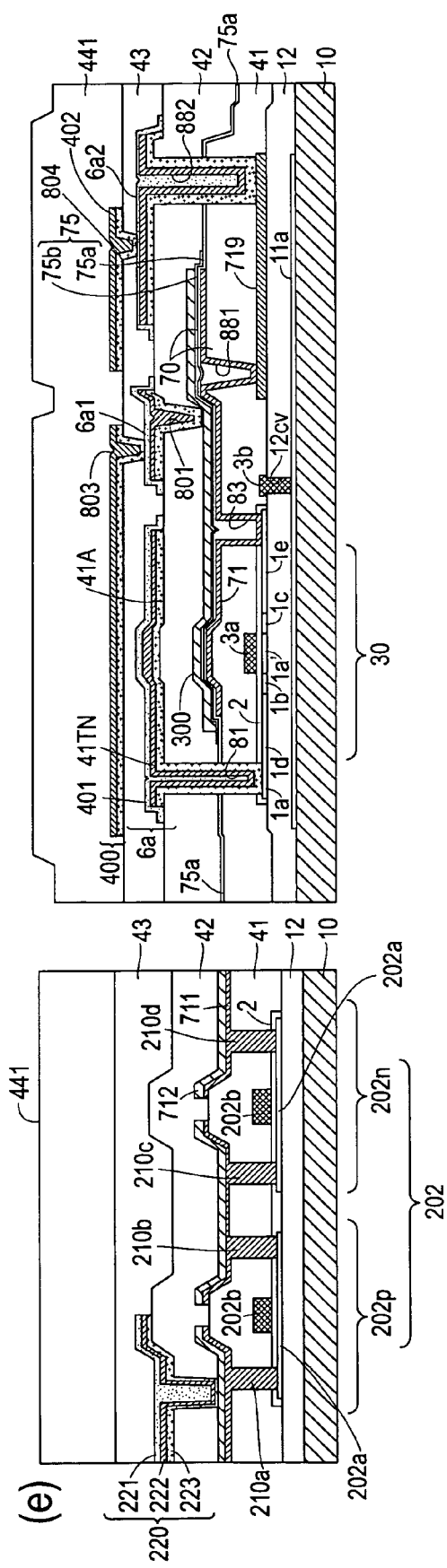
FIG. 9 is a cross-sectional schematic sequentially illustrating the processes (e) to (g) of the method of manufacturing the electro-optical device according to the present exemplary embodiment.
Figure 9:
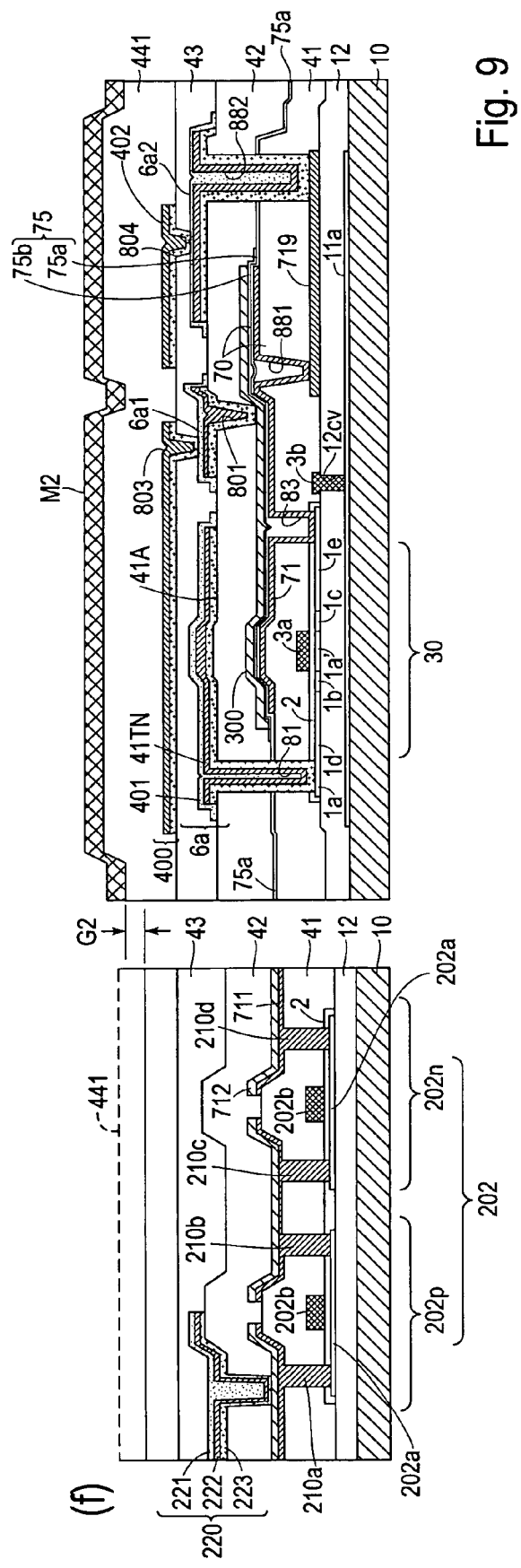
Figure 9:
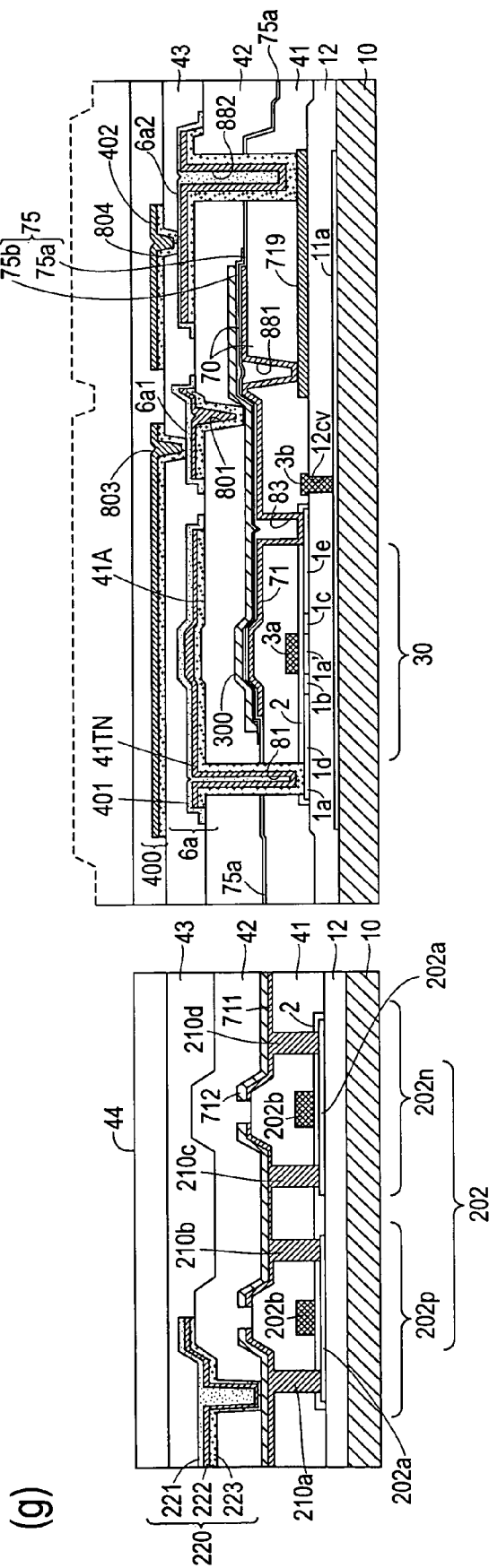
Figure 10:
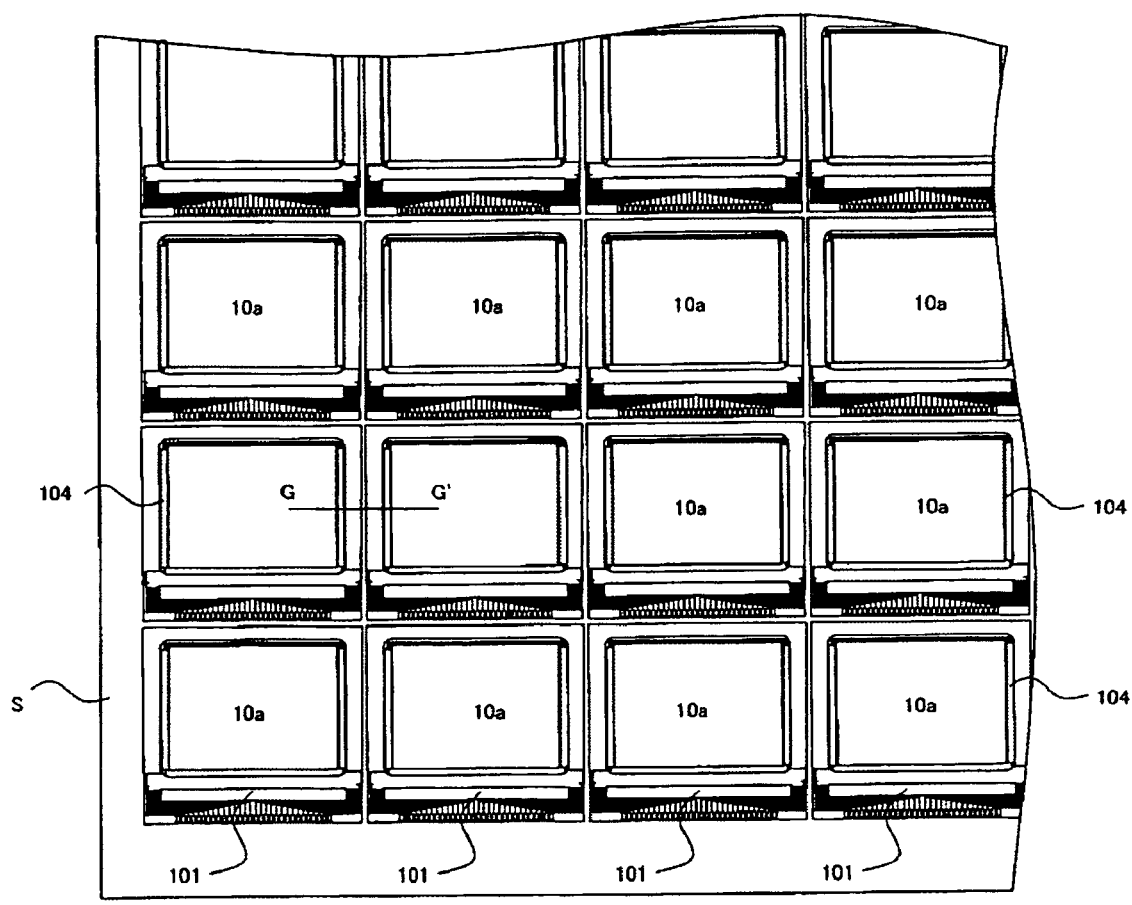
FIG. 10 is a schematic of a process in which a plurality of electro-optical devices according to the present exemplary embodiment is simultaneously formed on a glass substrate.

First, prior to describing the manufacturing processes of FIGS. 8 and 9, it is premised that the plurality of electro-optical devices according to the present exemplary embodiment are simultaneously formed on a large glass substrate S illustrated in FIG. 10. That is, on the glass substrate S, the electro-optical devices illustrated in FIG. 1 are horizontally and vertically arranged in a matrix. In each of the electro-optical devices, the laminated structure including the various components (the TFT 30, the storage capacitor 70, the CMOS-type TFT 202, and the scanning line driving circuit 104 or the data line driving circuit 101 including the above-mentioned components) illustrated in FIGS. 6 and 7 is established. To be specific, the glass substrate S illustrated in FIG. 10 corresponds to the TFT array substrate 10 illustrated in FIGS. 6 and 7. In addition, in FIG. 10, only the glass substrate S on which the TFT array substrate 10 is formed is illustrated. However, in addition to the above, the counter electrode 21 and the alignment film 22 are formed on another glass substrate (not shown) to thus form the plurality of counter substrates 20. At the same time, finally, the glass substrate S and another glass substrate (not shown) are bonded to each other so that the two glass substrates face each other. Then, liquid crystal is injected and sealed between the two glass substrates. Furthermore, the TFT array substrates 10 and the counter substrates 20 are cut out. Then a plurality of electro-optical devices illustrated in FIGS. 1 to 7 are manufactured.

Under such a premise, the electro-optical devices according to the present exemplary embodiment are sequentially manufactured on the glass substrate S illustrated in FIG. 10 as described in (a) to (d) of FIG. 8 and s (e) to (g) of FIG. 9.

First, in the step (a) of FIG. 8, a cross-sectional schematic at the point of time when a precursor film 431 of the third interlayer insulating film 43 is formed is illustrated. The precursor film 431 can be formed by an atmospheric pressure CVD method or a low pressure CVD method using a Tetraethyl orthosilicate (TEOS) gas, a tetraethyl borate (TEB) gas, and a tetramethyl oxyphorate (TMOP) gas. In this case, the third interlayer insulating film 43 is made of a silicate glass film, such as non-silicate glass (NSG), phosphor silicate glass (PSG), boron silicate glass (BSG), and boron phosphor silicate glass (BPSG), the silicon nitride film, and the silicon oxide film.

In the precursor film 431, as illustrated in the step (a) of FIG. 8, a step difference caused by the height of the data line 6a, the relay electrode 6a1 for the capacitive wiring line, and the second relay electrode 6a2, which are positioned on the lower layer, or the height of the gate electrode 3a and the relay electrode 719 on a layer lower than the above-mentioned layer is formed. As mentioned above, the heights of the various components on the lower layer affect the upper layer to thus cause an uneven step difference on the outermost surface (at the present point of time, the surface of the precursor film 431) of the laminated structure. In particular, according to the present exemplary embodiment, when the storage capacitors 70 and various contact holes other than the above-mentioned components are formed, the step difference may be complicated. Therefore, according to the present exemplary embodiment, in particular, in order to remove the step difference, as mentioned later, a CMP process is performed on the precursor film 431 ((c) of FIG. 8).

A difference exists between the density in which the components (the components in the image display region 10a) in the pixel portion on the right side of (a) of FIG. 8 are formed on the glass substrate S and the density in which the components in the peripheral region on the left side of FIG. 8 are formed on the glass substrate S. To be specific, in plan view, the density in which the wiring lines and the circuit elements, such as the CMOS-type TFTs 202, that constitute the scanning line driving circuits 104 and the data line driving circuit 101 are formed on the glass substrate S, is larger than the density in which the TFTs 30 and the pixel electrodes 9a are formed in the image display region 10a. This is because it is necessary to sparsely arrange various components in the image display region 10a in order to secure a light transmission region (refer to FIGS. 4 and 5). Furthermore, this is because it is necessary to reduce the size of the electro-optical device and to increase the size of the image display region. According to the present exemplary embodiment, to be specific, the pitch DD (refer to FIG. 5) between adjacent pixel electrodes 9a in the image display region 10a is equal to or more than 20 μm. Compared with the above-mentioned, the density in which the circuit elements, such as the CMOS-type TFTs 202, and the wiring lines are formed in the peripheral region is higher.

In a case in which such a difference in density exists between the image display region 10a and the peripheral region, in particular, between the image display region 10a and a portion of the peripheral region in which the scanning line driving circuits 104 or the data line driving circuit 101 are formed, when a planarizing process, such as a CMP process, is performed on the interlayer insulating film formed on the two regions, a difference in the height of the laminated structures between the two regions may be caused.

Figure 11:
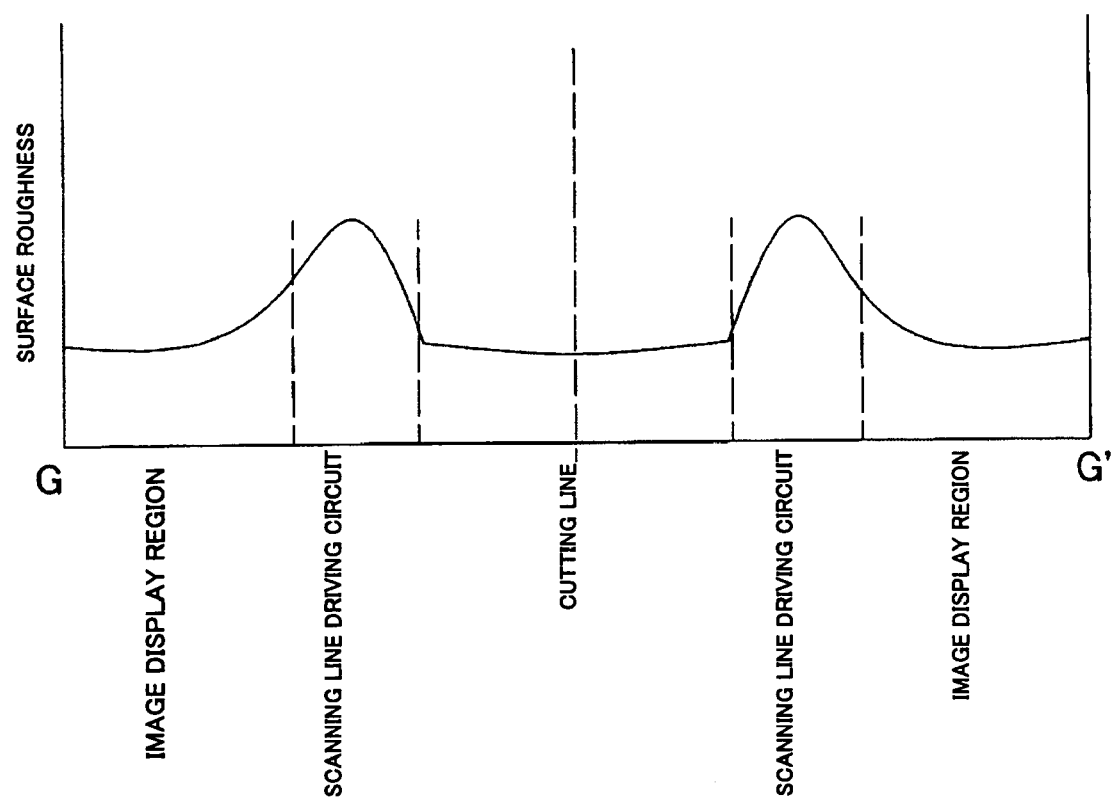
FIG. 11 is a graph (a surface profile) illustrating the results of measuring the illuminance of the outermost surface of a laminated structure on a TFT array substrate of the finally completed electro-optical device along the plane G-G' of FIG. 10.

To be specific, for example, a graph illustrated in FIG. 11 is obtained by the inventors' experiments. FIG. 11 is a graph (a surface profile) illustrating the results of measuring the illuminance of the outermost surface of the laminated structure along the plane G-G' of FIG. 10 in the TFT array substrate 10 of the finally completed electro-optical device. It is noted from FIG. 11 that a step difference is more remarkable in the region in which the scanning line driving circuits 104 as compared with the periphery thereof. To be specific, the height of the step difference is about 100 to 200 nm. This is because the image display region 10a in which the TFTs 30 are formed at a lower density is easily abraded than the peripheral region in which the CMOS-type TFTs 202 are formed at a higher density. That is, the step difference is also generated in the region in which the data line driving circuit 101 is formed. As a result, the step difference is formed or resides so as to surround the image display region 10a (refer to FIG. 1).

As mentioned above, although the planarizing process, such as the CMP process, is performed, the step difference is formed or resides corresponding to the region in which the scanning line driving circuits 104 or the data line driving circuit 101 are formed, thereby generating color irregularity around images to be displayed.

Therefore, according to the present exemplary embodiment, in order to remove the step difference, prior to performing the CMP process ((c) of FIG. 8) on the precursor film 431, the respective processes, which will be mentioned later, are performed.

First, in the (b) of FIG. 8, only in the components of the pixel portions, a mask M1 is formed on the precursor film 431. The region in which the mask M1 is formed corresponds to the shape obtained by connecting the outermost edges of the pixel electrodes 9a formed in a matrix to each other. The plane shape of the mask M1 is almost the same as that of the image display region 10a. An etching process, such as wet etching using hydrogen fluoride (HF), can be performed on the precursor film 431. Alternatively, dry etching, such as reactive ion etching or reactive ion beam etching, may be performed.

In the etching process, since the mask M1 is formed on the components in the pixel portions, the entire surface of the precursor film 431 is not etched, but only a portion of the peripheral region in which the CMOS-type TFTs 202 are formed is etched (refer to the dashed line in the (b) of FIG. 8). Therefore, a concave portion is formed in the outermost surface of the laminated structure, corresponding to the region in which the scanning line driving circuits 104 or the data line driving circuit 101 are formed, as seen from the image display region 10a. In addition, the depth G1 of the concave portion may be about 0.4 μm.

The depth G1 of the concave portion depends on the design thereof (that is, depends on various conditions, such as an etching time of the etching process, etc.) and can be freely determined in accordance with the size of the step difference (refer to FIG. 11) that can actually matter, the specific structure of the laminated structure (for example, whether the laminated structure is a lower layer structure or how thick the respective layers are), and various conditions, such as the applied pressure in the CMP process to be performed later.

As mentioned above, when only the precursor film 431 is etched in the peripheral region, the mask M1 is removed. Then, the CMP process is performed on both the peripheral region including the above-mentioned concave portion and the image display region 10a as illustrated in the (c) of FIG. 8. According to the CMP process, the substrate on which the precursor film 431 illustrated in the (b) of FIG. 8 (excluding the mask M1) is used as a substrate to be processed, and the surface of the substrate to be processed and the surface of an abrasive (a pad) contact with each other while rotating both the substrate to be processed and the abrasive. At the same time, an abrasive solution (slurry) including silica particles is supplied to the contacting portion thereof to thus abrade the surface of the substrate to be process by the balance of a mechanical action and a chemical action. According to the present exemplary embodiment, in particular, the pressure applied between the substrate to be processed and the abrasive may be equal to or more than 500 hPa. Therefore, it is possible to reduce abrasion time.

By performing the CMP process, the precursor film 431 becomes the third interlayer insulating film 43. At this time, the step difference caused by the heights of the data line 6a, the relay electrode 6a1 for the capacitive wiring line, the second relay electrode 6a2, the gate electrode 3a, the relay electrode 719, and the semiconductor layer 202a and the wiring line 220 that constitute the CMOS-type TFT 202 is removed with respect to the entire outermost surface (at the present point of time, the surface of the third interlayer insulating film 43) of the laminated structure. Therefore, the outermost surface of the laminated structure is completely planarized (refer to the (c) of FIG. 8).

According to the CMP process of the present exemplary embodiment, in particular, since the precursor film 431 in the peripheral region is previously concaved by the etching process as mentioned above, it is possible to properly balance the peripheral region with the image display region 10a, so that the step difference (refer to FIG. 11) does not reside in the peripheral region unlike in the related art technique (refer to the (c) of FIG. 8). That is, according to an aspect of the present invention, it is possible to completely planarize both the surface of the image display region 10a and the surface of the peripheral region.

As mentioned above, when the CMP process is completed, as illustrated in the (d) of FIG. 8, the contact holes 803 and 804 are formed in the third interlayer insulating film 43. Then, the capacitive wiring line 400 and the third relay electrode 402 are formed on the third interlayer insulating film 43. The contact holes 803 and 804 can be formed by the dry etching, such as the reactive ion etching and the reactive ion beam etching. First, after a precursor film made of aluminum, which is a lower layer, is formed by a sputtering method, the precursor film is patterned by photolithography and etching processes. Then, a film made of titan nitride, which is an upper layer, is formed and patterned according to the same process as the aluminum film-forming process, so that the capacitive wiring line 400 and the third relay electrode 402 are manufactured.

Next, according to the present exemplary embodiment, as illustrated in the (e) of FIG. 9, a precursor film 441 of the fourth interlayer insulating layer 44 is formed on the capacitive wiring line 400 and the third relay electrode 402. The precursor film 441 is formed by the same method as the method of forming the precursor film 431. Like on the precursor film 431, processes of forming a mask M2 and etching the mask M2 (refer to the (f) of FIG. 9) and the CMP process (refer to the (g) of FIG. 9) are performed on the precursor film 441. Also, the depth G2 of the concave portion formed by performing the etching process of the (f) of FIG. 9 may be about 0.1 µm. However, like the depth G1 of the concave portion, the depth G2 of the concave portion depends on the matter of a design that can change in accordance with various factors.

By performing the series of processes, it is possible to obtain the same effects as the effects mentioned above with respect to the precursor film 431 and the third interlayer insulating film 43. That is, since the CMP process is performed after the peripheral region is previously concaved, the step difference does not reside in the peripheral region. Therefore, it is possible to completely planarize both the peripheral region and the image display region 10a. Also, by performing the CMP process, the step difference caused by the heights of the capacitive wiring line 400 and the capacitive electrode 402 is removed. Thus, it is possible to completely planarize the surface of the peripheral region and the surface of the image display region 10a.

As mentioned above, when the etching process is performed according to the number of times of the CMP processes, it is possible to effectively obtain the effects of the present exemplary embodiment.

When the above processes are completed, the contact hole 89 is formed in the fourth interlayer insulating film 44, and the pixel electrode 9a and the alignment film 16 are formed. Then, the electro-optical device on the TFT array substrate 10 is completely manufactured. Subsequently or together with the above processes, as mentioned above, on another glass substrate other than the glass substrate S, the counter electrode 21 and the alignment film 22 are formed to thus manufacture the counter substrate 20. At the same time, the glass substrate S and another glass substrate are bonded to each other with the sealing material 52 interposed therebetween, and the liquid layer 50 is sealed, thereby completely manufacturing an electro-optical device.

Further, according to the above exemplary embodiment, the etching process is performed twice in the (b) of FIG. 8 and the (f) of FIG. 9. However, the present invention is not limited thereto. For example, as mentioned above, the CMP process is performed twice in the (c) of FIG. 8 and the (g) of FIG. 9. However, the etching process may be performed once only in the (b) of FIG. 8 or the (f) of FIG. 9. Furthermore, to be more flexible, the etching process does not have to be performed only in the (b) of FIG. 8 and the (f) of FIG. 9. That is, in the step of performing the CMP process, when the peripheral region is concaved as seen from the image display region 10a, it is possible to completely planarize both the peripheral region and the image display region 10a. Therefore, the point of time when the etching process is performed can be determined in such a point of view. To be extreme, only the etching process may be performed on the peripheral region before the (a) of FIG. 8, for example, at the point of time when the first interlayer insulating film 41 (or the second interlayer insulating film 42) is completely formed so that the peripheral region is previously concaved as seen from the image display region. In short, when the etching process is to be performed before performing the CMP process, it is possible to achieve a basic object of an aspect of the present invention.

Also, according to the present exemplary embodiment, the CMOS-type TFTs 202 are formed only in the peripheral region. However, the present invention is not restricted to this. Instead of or in addition to the CMOS-type TFTs 202, simple p-type and n-type TFTs, various wiring lines, and a light shielding film to prevent light from being incident on the TFTs may constitute the scanning line driving circuits 104 and the data line driving circuit 101.

Since it is assumed that the various components are commonly formed at a higher density compared with the TFTs 30 and the pixel electrodes 9a in the image display region 10a, it is possible to obtain the above-mentioned effects according to the present exemplary embodiment.

Furthermore, the size (refer to FIG. 10) of the image display region 10a is not mentioned. However, in order to more effectively obtain the effects according to the present exemplary embodiment, the size of the image display region 10a may be equal to or more than 1.0 inch. This is because, as mentioned above, when the image display region 10a is large, the TFTs 30 and the pixel electrodes 9a are formed in the image display region 10a at a lower density and the CMOS-type TFTs 202 are formed at a higher density in the peripheral region.

Electronic Apparatus

Next, the general structure, in particular, the optical structure of a projection color display apparatus, which is an example of the electronic apparatus, in which the above-mentioned electro-optical device is used as a light valve will be described. Here, FIG. 12 is a schematic cross-section of the projection color display apparatus.

Figure 12:
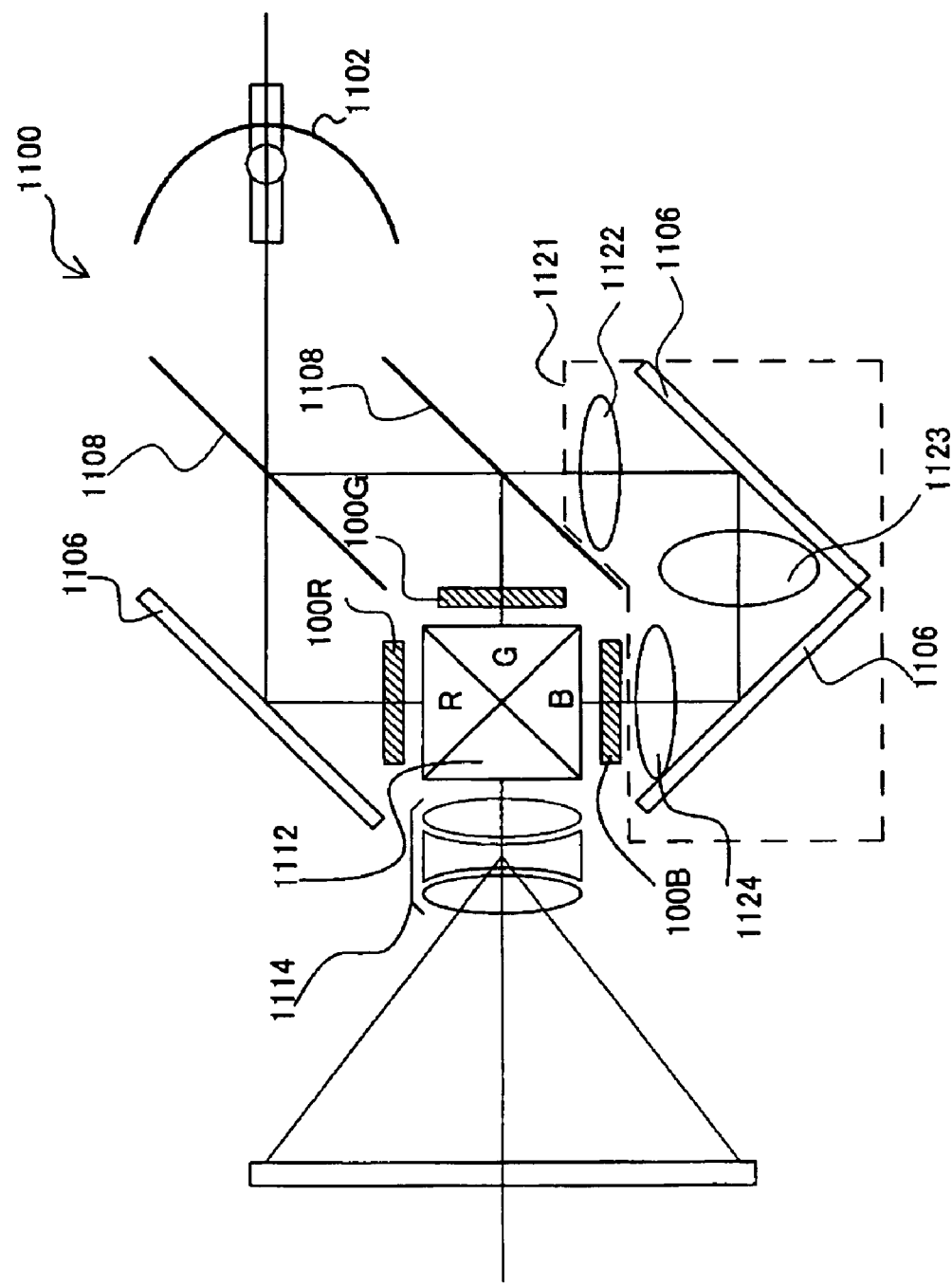
FIG. 12 is a schematic cross-sectional view illustrating a color liquid crystal projector, which is an example of a projection type color display device according to an embodiment of an electronic apparatus of the present invention.

In FIG. 12, a liquid crystal projector 1100, which is an example of the projection color display apparatus according to the present exemplary embodiment has three liquid crystal modules including a liquid crystal device in which driving circuits are mounted on a TFT array substrate, and the three liquid crystal modules are used as RGB light valves 100R, 100G, and 100B. In the liquid crystal projector 1100, when projection light is emitted from a lamp unit 1102 of a white light source, such as a metal halide lamp, the projection light is divided into light components R, G, and B corresponding to the three primary colors of RGB by three mirrors 1106 and two dichroic mirrors 1108, and the light components R, G, and B are guided to light valves 100R, 100G, and 100B of the respective colors. At this time, in particular, the light component B is guided through a relay lens system 1121 composed of an incidence lens 1122, a relay lens 1123, and an emission lens 1124 in order to reduce or prevent the optical loss due to a long optical path. The light components corresponding to the three primary colors that are respectively modulated by the light valves 100R, 100G, and 100B are synthesized by a dichroic prism 1112 and are then projected on a screen 1120 through a projector lens 1114 as color images.

While this invention has been particularly shown and described with reference to preferred exemplary embodiments thereof, it will be understood by those skilled in the art that various changes in form and details may be made therein without departing from the spirit and scope of the invention as defined by the appended claims. The electro-optical device, the method of manufacturing the same, and the electronic apparatus that accompany such changes are also included in the technical scope of the present invention.

What is claimed is:

1. A method of manufacturing an electro-optical device, comprising:
   forming data lines that extend in a certain direction and scanning lines that extend orthogonal to the data lines in an image display region on a substrate;

forming switching elements to which scanning signals are supplied by the scanning lines;

forming pixel electrodes to which image signals are supplied by the data lines via the switching elements;

forming driving circuits to drive the data lines and the scanning lines in a peripheral region around the image display region;

forming an interlayer insulating film on the data lines, the scanning lines, the switching elements, and the driving circuits;

etching portions of the interlayer insulating film corresponding to regions in which the driving circuits are formed in the interlayer insulating film formed in the peripheral region, while excluding portions of the interlayer insulating film corresponding to the image display region from the etching process; and performing a planarizing process on the interlayer insulating film of both the peripheral region and the image display region after the etching.

2. The method of manufacturing the electro-optical device according to claim 1, the driving circuits including circuit elements and wiring lines, forming the driving circuits includes forming the circuit elements and the wiring lines, and a first formation density of the circuit elements and the wiring lines on the substrate in plan view being larger than a second formation density of the switching elements and the pixel electrodes.

3. The method of manufacturing the electro-optical device according to claim 2, the second formation density being defined such that the pitch between the pixel electrodes adjacent to each other is equal to or more than 15 μm.

4. The method of manufacturing the electro-optical device according to claim 1, the size of the image display region being equal to or more than 1.0 inch.

5. The method of manufacturing the electro-optical device according to claim 1, the planarizing process including a chemical mechanical polishing (CMP) process.

6. The method of manufacturing the electro-optical device according to claim 5, in the CMP process, the applied pressure being equal to or more than 500 hPa.

7. The method of manufacturing the electronic apparatus according to claim 1, the pixel electrodes being arranged in a matrix in plan view, and the method further comprising:

before the etching step, forming a mask corresponding to a shape formed by connecting the outermost edges of outermost pixel electrodes of the pixel electrodes in the matrix.

8. The method of manufacturing the electro-optical device according to claim 1, further, comprising:

prior to forming the pixel electrodes, forming a first interlayer insulating film as the forming the interlayer insulating film;

etching at least portions corresponding to regions in which the driving circuits are formed in the first interlayer insulating film formed in the peripheral region;

performing a planarizing process on the first interlayer insulating film of both the peripheral region and the image display region after the first etching;

forming on the first interlayer insulating film a second interlayer insulating film as the forming the interlayer insulating film;

etching at least portions corresponding to regions in which the driving circuits are formed in the second interlayer insulating film formed in the peripheral region; and a second planarizing process of performing a planarizing process on the second interlayer insulating film of both the peripheral region and the image display region after the second etching, the pixel electrodes formed on the second interlayer insulating film.

9. A method of manufacturing a substrate device in which at least one of circuit elements and wiring lines forms a laminated structure on a substrate, comprising:

forming a low density region and a high density region in which at least one of the circuit elements and the wiring lines is formed at a lower density and at a higher density in the plan view of the substrate;

forming an interlayer insulating film in the low density region and the high density region;

forming a mask in a portion corresponding to the low density region on the outermost surface of the laminated structure, the mask leaving at least a portion of the outermost surface corresponding to the high density region exposed;

etching the interlayer insulating film after the step of forming the mask; and performing a planarizing process on the interlayer insulating film with the mask removed after the etching.

\* \* \* \* \*